(12) United States Patent
Hariya

(10) Patent No.: US 12,445,032 B2
(45) Date of Patent: Oct. 14, 2025

(54) CURRENT DETECTION CIRCUIT, POWER CONVERSION DEVICE, AND POWER SYSTEM

(71) Applicant: TDK CORPORATION, Tokyo (JP)

(72) Inventor: Akinori Hariya, Tokyo (JP)

(73) Assignee: TDK CORPORATION, Tokyo (JP)

( * ) Notice: Subject to any disclaimer, the term of this patent is extended or adjusted under 35 U.S.C. 154(b) by 254 days.

(21) Appl. No.: 18/033,661

(22) PCT Filed: Oct. 26, 2021

(86) PCT No.: PCT/JP2021/039437
§ 371 (c)(1),
(2) Date: Apr. 25, 2023

(87) PCT Pub. No.: WO2022/092065
PCT Pub. Date: May 5, 2022

(65) Prior Publication Data
US 2023/0402910 A1   Dec. 14, 2023

(30) Foreign Application Priority Data

Oct. 30, 2020   (JP) ................................ 2020-182301

(51) Int. Cl.
*H02M 1/00* (2007.01)
*G01R 15/18* (2006.01)
*H02M 3/335* (2006.01)

(52) U.S. Cl.
CPC ........ *H02M 1/0009* (2021.05); *G01R 15/183* (2013.01); *H02M 3/33584* (2013.01)

(58) Field of Classification Search
CPC ............ H02M 1/0009; H02M 3/33584; G01R 15/183
See application file for complete search history.

(56) References Cited

U.S. PATENT DOCUMENTS 9,941,784 B1 *   4/2018   Li ...................... G01R 15/183

FOREIGN PATENT DOCUMENTS

| CN | 206671401 U | 11/2017 |
|---|---|---|
| CN | 107607773 A | 1/2018 |
| CN | 108631580 A | 10/2018 |
| JP | S52-147731 A | 12/1977 |
| JP | S60-53064 U | 4/1985 |
| JP | 2007-325340 A | 12/2007 |
| JP | 2011-102738 A | 5/2011 |

OTHER PUBLICATIONS

Jan. 11, 2022 International Search Report issued in International Patent Application No. PCT/JP2021/039437.

* cited by examiner

*Primary Examiner* — Rafael O De Leon Domenech
(74) *Attorney, Agent, or Firm* — Oliff PLC

(57) ABSTRACT

A current detection circuit can minutely adjust characteristics when currents flowing in two directions in a current transformer are detected. The current detection circuit is configured to detect a value of a switching current through a detection resistor using a current transformer, and the value of the switching current is detected by switching the detection resistor and a reset resistor on the basis of a flow direction of the switching current flowing on a primary side of the current transformer.

17 Claims, 10 Drawing Sheets

CURRENT DETECTION CIRCUIT, POWER CONVERSION DEVICE, AND POWER SYSTEM

TECHNICAL FIELD

The present disclosure relates to a current detection circuit, a power conversion device, and a power system.

BACKGROUND ART

In a switching power source, a current is detected using a current transformer when a pulse-shaped direct current is detected. For example, when a current flows in a predetermined direction (for example, a positive direction) in a current transformer, a diode is turned on and the current can be detected using a detection resistor.

However, in a converter which needs to perform a bidirectional operation or a precharging operation, a direction of a current flowing in a current transformer varies between the time of operating forward and the time of operating in reverse. When a current flows in a positive direction at the time of operating forward, the current can be detected using a detection resistor. When a current flows in a negative direction at the time of operating in reverse, a diode is not turned on and thus the current cannot be detected using the detection resistor.

For example, a configuration including a current transformer for forward operation and a current transformer for reverse operation is considered as a configuration for detecting both a current at the time of operating forward and a current at the time of operating in reverse. In this case, two current transformers are necessary and thus there is a problem with an increase in the number of components and an increase in circuit scale.

Here, in a rectifier circuit described in Patent Document 1, a current with a pulse-like flow on a primary side of a current transformer can be detected irrespective of direction in which the current flows (see Patent Document 1). The rectifier circuit is a full-bridge rectifier circuit which is connected to a secondary side of the current transformer and selects a current path based on a flow of a secondary current.

CITATION LIST

Patent Document

Patent Document 1

Japanese Unexamined Patent Application, First Publication No. 2007-325340

SUMMARY OF INVENTION

Technical Problem

However, in the rectifier circuit described in Patent Document 1, it may be difficult to minutely adjust characteristics when currents flowing in two directions in the current transformer are detected.

The present disclosure was invented in consideration of the aforementioned circumstances and an objective thereof is to provide a current detection circuit, a power conversion device, and a power system that can minutely adjust characteristics when currents flowing in two directions in a current transformer are detected.

Solution to Problem

According to an aspect of the present disclosure, there is provided a current detection circuit configured to detect a value of a switching current through a detection resistor using a current transformer, wherein the value of the switching current is detected by switching the detection resistor and a reset resistor on the basis of a flow direction of the switching current flowing on a primary side of the current transformer.

According to another aspect of the present disclosure, there is provided a power conversion device including the current detection circuit.

According to another aspect of the present disclosure, there is provided a power system including the power conversion device.

Advantageous Effects of Invention

With the current detection circuit, the power conversion device, and the power system according to the present disclosure, it is possible to minutely adjust characteristics when currents flowing in two directions in a current transformer are detected.

Figure 6:
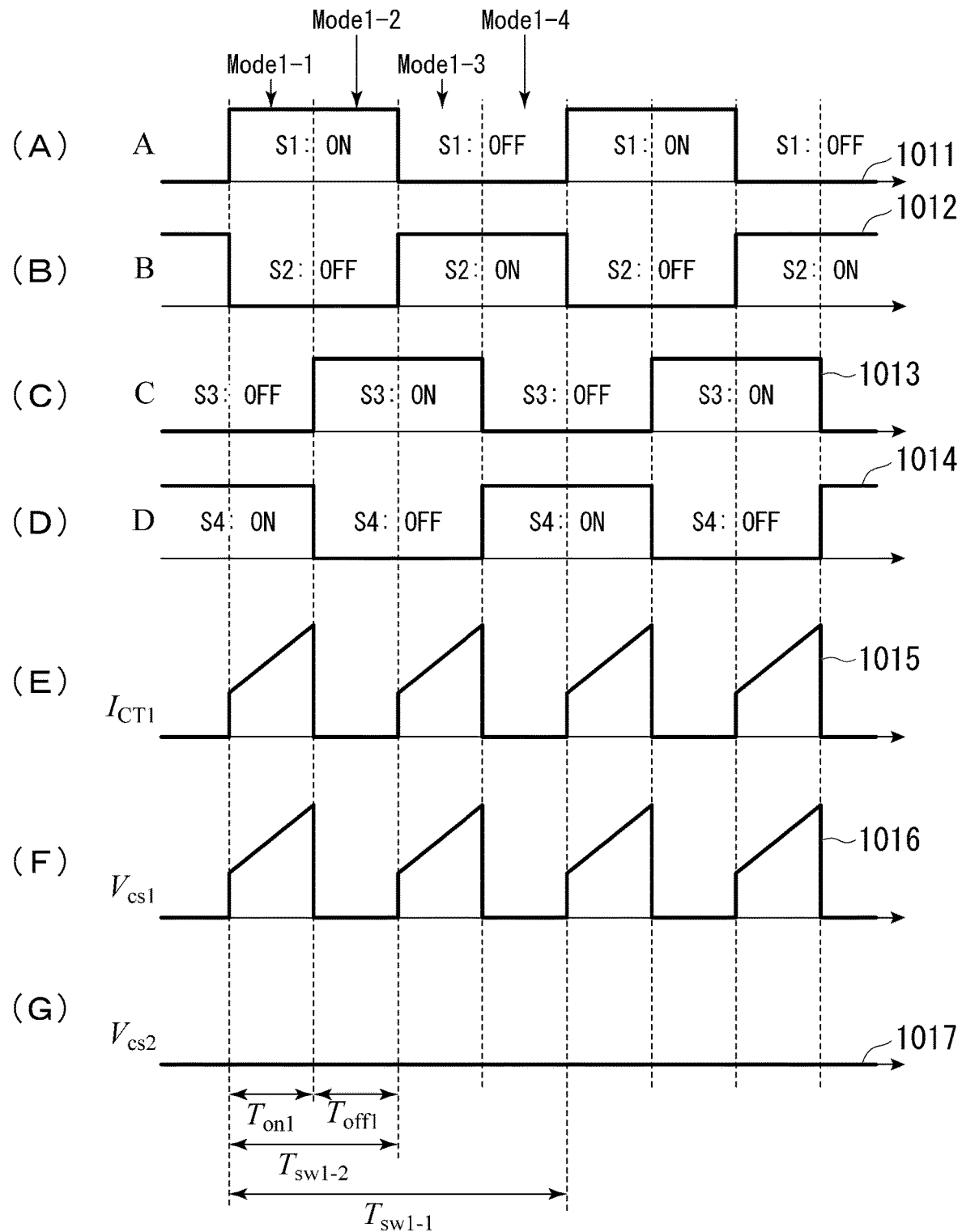

(A) to (G) of FIG. 6 are diagrams illustrating operation waveforms of constituents according to the second embodiment.

Figure 7:
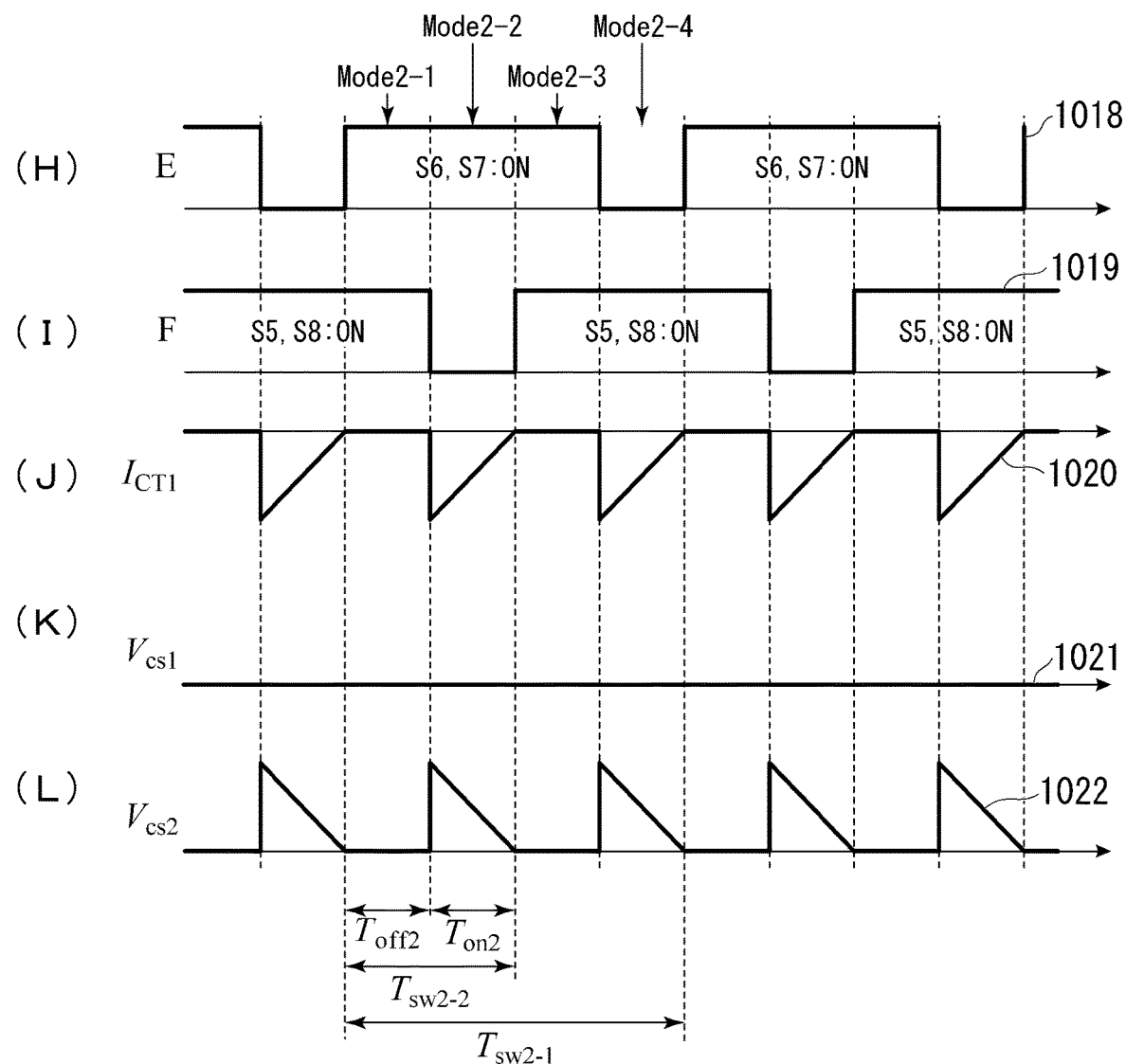

(H) to (L) of FIG. 7 are diagrams illustrating operation waveforms of constituents according to the second embodiment.

Figure 8:
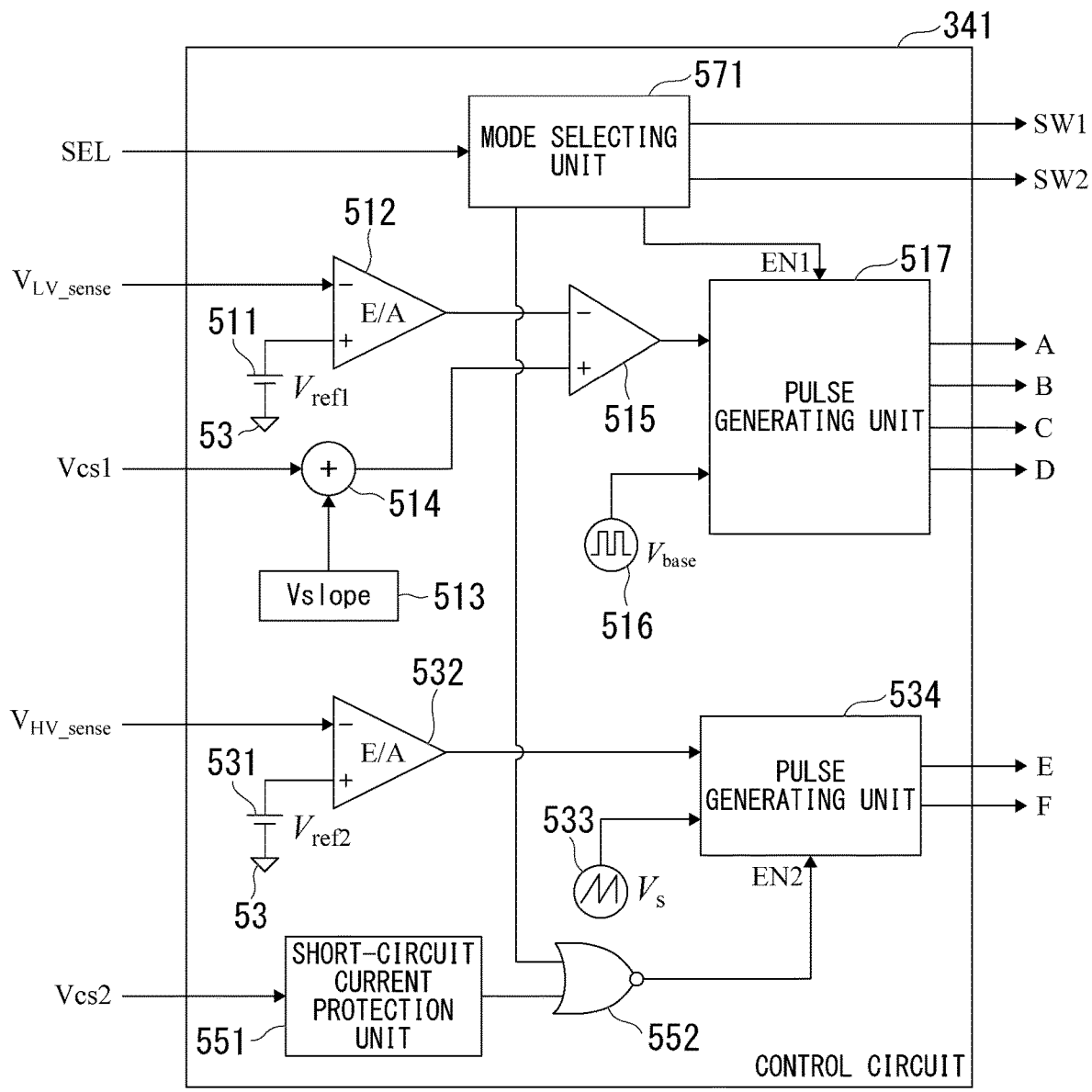

FIG. 8 is a diagram illustrating a configuration of a control circuit according to the second embodiment.

Figure 9:
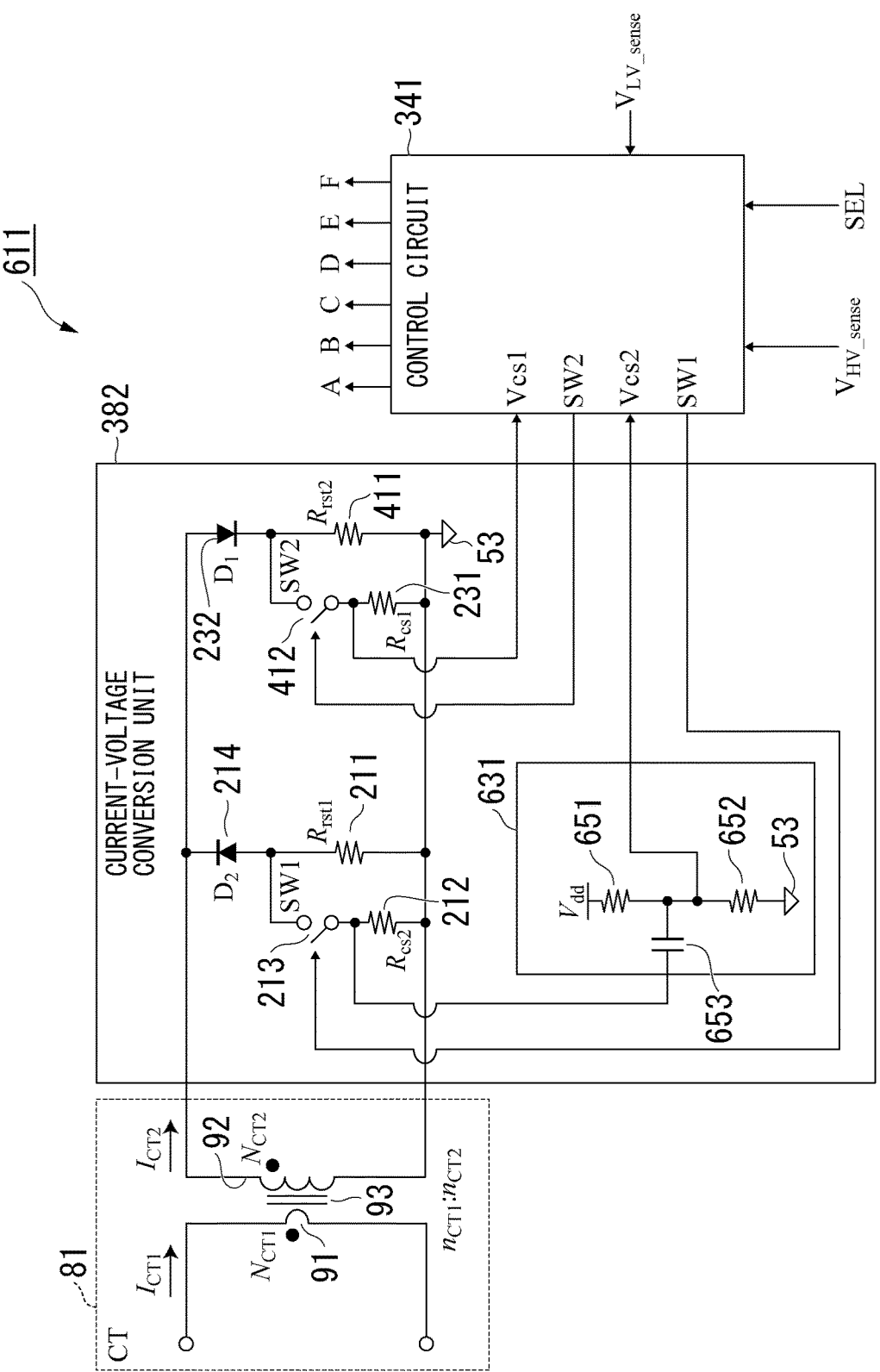

FIG. 9 is a diagram illustrating a configuration of a current detecting unit according to a third embodiment.

Figure 10:
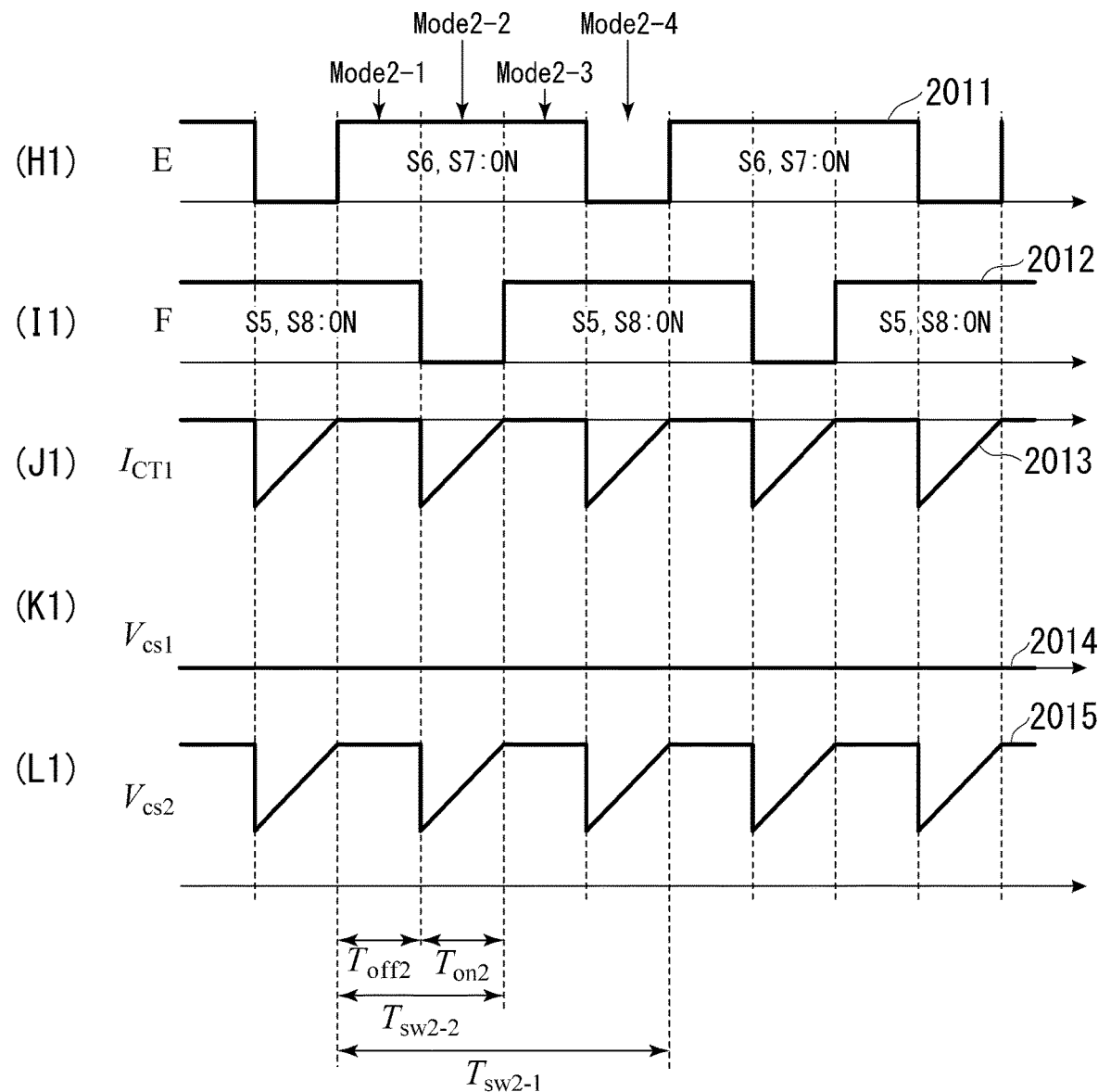

(H1) to (L1) of FIG. 10 are diagrams illustrating operation waveforms of constituents according to the third embodiment.

DESCRIPTION OF EMBODIMENTS

Hereinafter, embodiments of the present disclosure will be described with reference to the accompanying drawings.

First Embodiment

Power System

Figure 1:
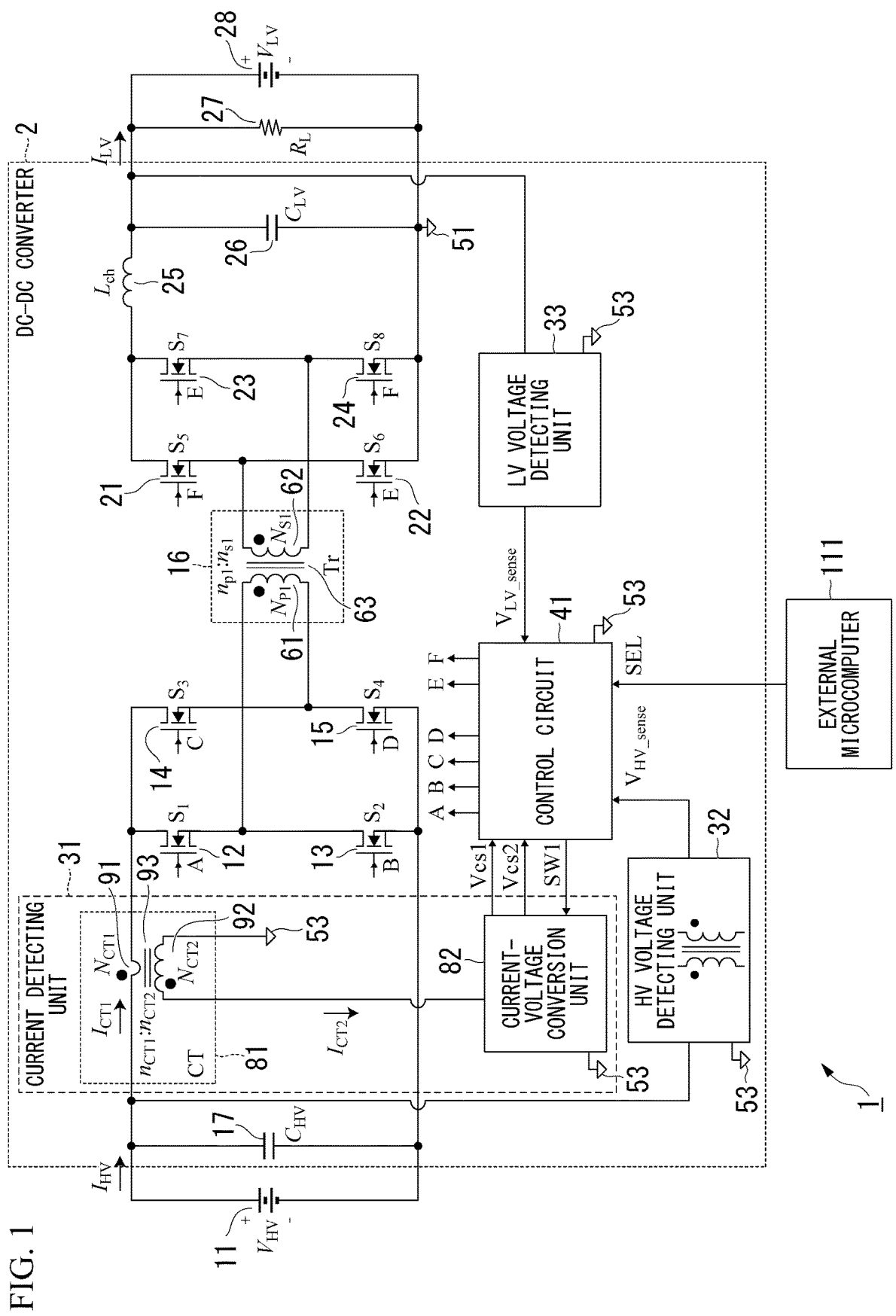
FIG. 1 is a diagram illustrating a configuration of a power system according to a first embodiment.

FIG. 1 is a diagram illustrating a configuration of a power system 1 according to a first embodiment.

The power system 1 includes a DC power source 11 (a power source $V_{HV}$) which is, for example, a battery, a DC-DC converter 2 which is an example of a power conversion device, a resistor 27 (a resistor $R_L$) which is, for example, a load, a DC power source 28 (a power source $V_{LV}$) which is, for example, a battery, and an external microcomputer 111.

In this embodiment, it is assumed that the power system 1 is mounted in a vehicle and the DC-DC converter 2 performing directional operations is mounted in the vehicle, but the present disclosure is not limited thereto.

In this embodiment, the power source $V_{HV}$ is a high-voltage battery voltage, the power source $V_{LV}$ is an auxiliary-machine battery voltage, and the resistor $R_L$ is a vehicle load.

DC-DC Converter

The DC-DC converter 2 includes four FETs 12 to 15 (switching elements) of which each is a metal oxide semiconductor-field effect transistor (MOS-FET), a transformer 16 (a transformer Tr), a capacitor 17 (a capacitor $C_{HV}$), four FETs 21 to 24 (switching elements) of which each is a MOS-FET, a choking coil 25 (a choking coil $L_{ch}$), a capacitor 26 (a capacitor $C_{LV}$), a current detecting unit 31 including a current detection circuit, an HV voltage detecting unit 32, an LV voltage detecting unit 33, and a control circuit 41.

The transformer 16 includes a primary winding 61 (a primary winding $N_{P1}$), a secondary winding 62 (a secondary winding $N_{S1}$), and a core 63.

The current detecting unit 31 includes a current transformer 81 (a current transformer CT) and a current-voltage conversion unit 82.

The current transformer 81 includes a primary winding 91 (a primary winding $N_{CT1}$), a secondary winding 92 (a secondary winding $N_{CT2}$), and a core 93.

A grounding end 51 and a grounding end 53 are ends with a reference potential.

In this embodiment, the reference potential is ground (GND). In this embodiment, the grounding end 51 and the grounding end 53 may be shared.

A full-bridge circuit including four FETs 12 to 15 generates a primary transformer voltage from a DC voltage $V_{HV}$.

The transformer 16 converts the primary transformer voltage $V_{HV}$ generated by the full-bridge circuit to a secondary transformer voltage $V_{LV}$ at a turn ratio and transmits the secondary transformer voltage.

$$V_{LV} = n_{s1}/n_{p1} \times V_{HV}$$

Here, the turn ratio is a turn ratio of the primary winding 61 and the secondary winding 62 and is $n_{p1}:n_{s1}$.

The four FETs 21 to 24 rectify a secondary AC voltage and generate a DC voltage.

The choking coil 25 and the capacitor 26 smooth the rectified DC voltage.

Here, one connection end opposite to the choking coil 25 out of connection ends of the resistor 27 and the DC power source 28 is connected to the grounding end 51.

One connection end opposite to the choking coil 25 out of connection ends of the sources of the two FETs 22 and 24 and the capacitor 26 is connected to the grounding end 51. This configuration is an example. For example, the choking coil 25 may be disposed on the grounding end 51 side, that is, may be disposed on the source side of the FETs 22 and 24.

At the time of operating forward (operating to transmit electric power from the primary side to the secondary side in this embodiment), four operation modes are used depending on states of the four FETs 12 to 15.

Mode 1-1 is a mode in which the FET 12 and the FET 15 are in an ON state and the FET 13 and the FET 14 are in an OFF state. At this time, electric power is transmitted from the primary side to the secondary side of the transformer 16, electric power is supplied to an output thereof, and energy is stored in the choking coil 25.

Mode 1-2 is a mode in which the FET 12 and the FET 14 are in the ON state and the FET 13 and the FET 15 are in the OFF state. At this time, a return current is generated on the primary side of the transformer 16 and energy is discharged from the choking coil 25 to the output.

Mode 1-3 is a mode in which the FET 13 and the FET 14 are in the ON state and the FET 12 and the FET 15 are in the OFF state. At this time, electric power is transmitted from the primary side to the secondary side of the transformer 16, electric power is supplied to the output thereof, and energy is stored in the choking coil 25.

Mode 1-4 is a mode in which the FET 13 and the FET 15 are in the ON state and the FET 12 and the FET 14 are in the OFF state. At this time, a return current is generated on the primary side of the transformer 16 and energy is discharged from the choking coil 25 to the output.

After operations of Mode 1-1 to Mode 1-4 have been completed, the operations of Mode 1-1 to Mode 1-4 are repeated from Mode 1-1.

In each mode, an AC component of the current flowing in the choking coil 25 flows in the capacitor 26.

In this embodiment, turning-on/off of four FETs 12 to 15 is controlled under the control of the control circuit 41, an on-duty width of the semiconductor switching elements is adjusted, and thus a time ratio of a power transmission time is adjusted such that a desired output voltage is achieved.

In this embodiment, turning-on/off of four FETs 21 to 24 is controlled under the control of the control circuit 41.

At the time of operating in reverse (operating to transmit electric power from the secondary side to the primary side in this embodiment), four operation modes are used depending on states of the four FETs 21 to 24.

Mode 2-1 is a mode in which all the FETs 21 to 24 are in the on state. At this time, energy is stored in the choking coil 25 on the secondary side of the transformer 16.

Mode 2-2 is a mode in which the FET 22 and the FET 23 are in the ON state and the FET 21 and the FET 24 are in the OFF state. At this time, the transformer 16 transmits electric power along with the energy stored in the choking coil 25 from the secondary side to the primary side.

Mode 2-3 is a mode in which all the FETs 21 to 24 are in the on state. At this time, energy is stored in the choking coil 25 on the secondary side of the transformer 16.

Mode 2-4 is a mode in which the FET 21 and the FET 24 are in the ON state and the FET 22 and the FET 23 are in the OFF state. At this time, the transformer 16 transmits electric power along with the energy stored in the choking coil 25 from the secondary side to the primary side.

After operations of Mode 2-1 to Mode 2-4 have been completed, the operations of Mode 2-1 to Mode 2-4 are repeated from Mode 2-1.

The current detecting unit 31 detects a primary input current $I_{CT1}$.

The current transformer 81 in the current detecting unit 31 converts the primary input current $I_{CT1}$ to a detected current $I_{CT2}$ at a turn ratio.

$$I_{CT2} = n_{CT1}/n_{CT2} \times I_{CT1}$$

Here, the turn ratio is a turn ratio of the primary winding 91 and the secondary winding 92 and is $n_{CT1}:n_{CT2}$.

In general, in the current transformer 81, the number of turns $n_{CT1}$ of the primary winding 91 is small and the number of turns $n_{CT2}$ of the secondary winding 92 is large. In a specific example, the number of turns $n_{CT1}$ of the primary winding 91 is 1 and the number of turns $n_{CT2}$ of the secondary winding 92 is 100, but the present disclosure is not limited thereto.

One end of the secondary winding 92 is connected to a grounding end 53.

In the current detecting unit 31, the current-voltage conversion unit 82 converts the detected current $I_{CT2}$ to a detected voltage $V_{CS}$ which is a voltage detectable by the control circuit 41 (a detected voltage $V_{CS1}$ at the time of operating forward or a detected voltage $V_{CS2}$ at the time of operating in reverse in this embodiment).

The HV voltage detecting unit 32 has an insulating element therein and converts a DC voltage $V_{HV}$ to a voltage $V_{HV\_sense}$ which is a voltage detectable by the control circuit 41.

The LV voltage detecting unit 33 converts a DC voltage $V_{LV}$ to a voltage $V_{LV\_sense}$ which is a voltage detectable by the control circuit 41.

The control circuit 41 is, for example, a microcomputer or a digital signal processor (DSP).

The control circuit 41 receives an input of the detected voltage $V_{CS}$ acquired by the current-voltage conversion unit 82 of the current detecting unit 31, the voltage $V_{HV\_sense}$ acquired by the HV voltage detecting unit 32, and the voltage $V_{LV\_sense}$ acquired by the LV voltage detecting unit 33 and controls operations of the constituents on the basis of the values of the voltages.

For example, the control circuit 41 outputs a switch switching signal SW1 for controlling a reset part of the current transformer 81 to the current-voltage conversion unit 82.

The control circuit 41 outputs a signal for controlling turning-on/off of the FETs 12 to 15 to the gates of the FETs 12 to 15 via a driver (not illustrated) provided for each drive system.

The control circuit 41 outputs a signal for controlling turning-on/off of the FETs 21 to 24 to the gates of the FETs 21 to 24 via a driver (not illustrated) provided for each drive system.

In general, a driver for driving the FETs is required between the FETs 12 to 15 and the FETs 21 to 24 and the control circuit 41, but it is assumed that the FETs 12 to 15 and the FETs 21 to 24 can be directly driven by outputting a signal from the control circuit 41 for the purpose of simplification of description.

The control circuit 41 is controlled by the external microcomputer 111.

The external microcomputer 111 is a microcomputer of an electronic control unit (ECU) provided in a vehicle in this embodiment.

The external microcomputer 111 outputs a selection signal SEL to the control circuit 41 on the basis of a vehicle state. The selection signal SEL is a signal for selectively instructing the DC-DC converter 2 to perform a forward operation or a reverse operation.

The external microcomputer 111 outputs the selection signal SEL, for example, on the basis of a state of the DC power source 11 (power source $V_{HV}$) and a voltage state of the DC power source 28 (power source $V_{LV}$).

In this embodiment, the current $I_{HV}$ serves as a positive current in the forward operation, and the current $I_{HV}$ serves as a negative current in the reverse operation.

In the forward operation, the DC-DC converter 2 charges the DC power source 28 by supplying electric power to the DC power source 28 using a DC voltage $V_{HV}$ supplied from the DC power source 11. On the other hand, in the reverse operation, the DC-DC converter 2 discharges the DC power source 28 by supplying electric power to the DC power source 11 using the DC voltage $V_{LV}$ supplied from the DC power source 28.

Current Detecting Unit

Figure 2:
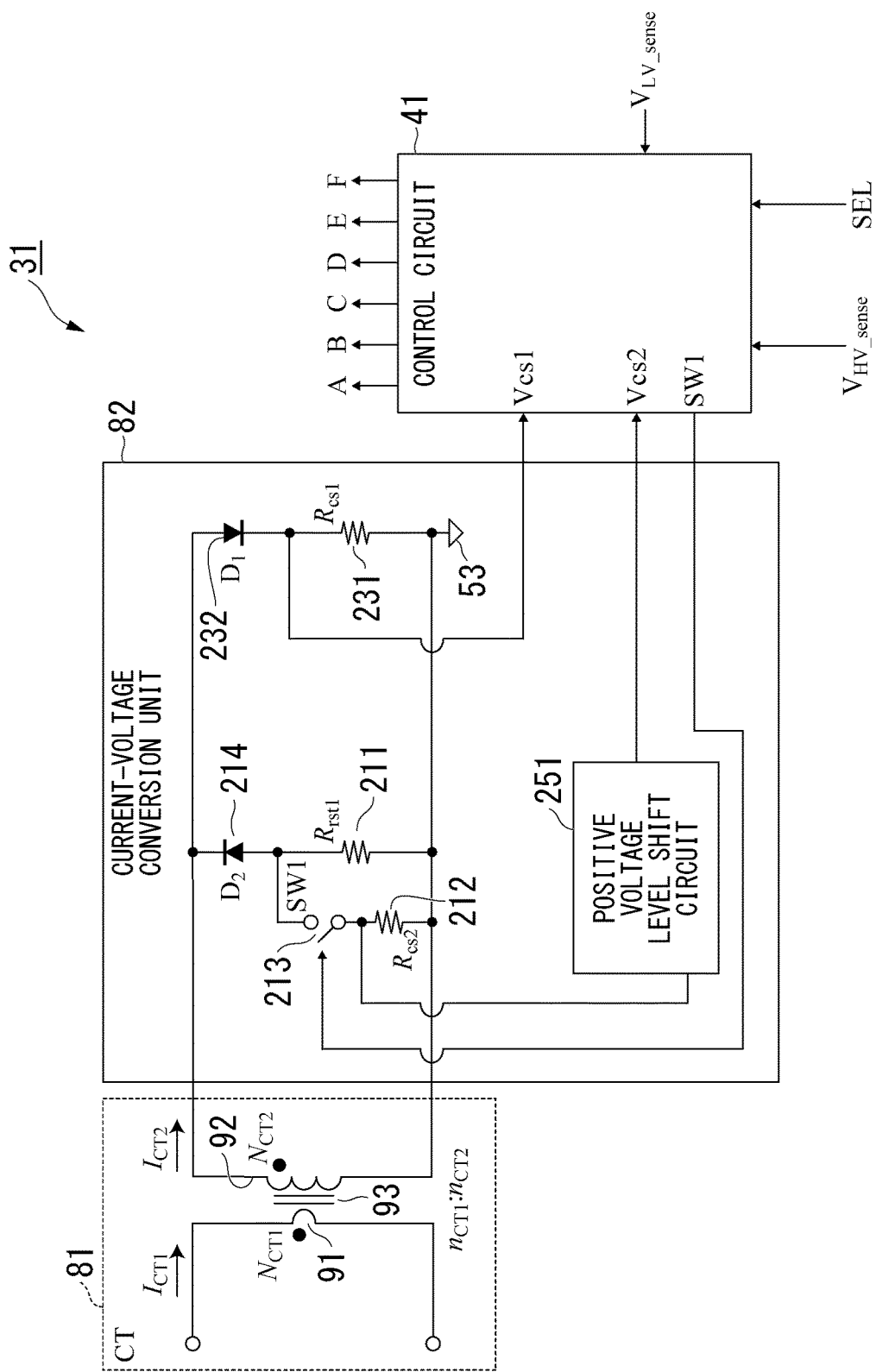
FIG. 2 is a diagram illustrating a configuration of a current detecting unit according to the first embodiment.

FIG. 2 is a diagram illustrating the configuration of the current detecting unit 31 according to the first embodiment.

In the current detecting unit 31, the current-voltage conversion unit 82 includes a first detection resistor 231 (a first detection resistor $R_{CS1}$), a diode 232 (a diode $D_1$), a first reset resistor 211 (a first reset resistor $R_{rst1}$), a second detection resistor 212 (a second detection resistor $R_{CS2}$), a first switching element 213, a diode 214 (a diode $D_2$), and a positive voltage level shift circuit 251.

The diode 232 and the first detection resistor 231 are connected in series. This series connection circuit is connected in parallel to the secondary winding 92 of the current transformer 81.

In a voltage across both ends of the first detection resistor 231, a low-potential side is connected to the grounding end 53, and a high-potential side is connected to the control circuit 41 such that a positive voltage generated on the high-potential side is input as the first detection voltage $V_{CS1}$ to the control circuit 41.

The diode 232 is connected such that the diode 232 is turned on when a switching current flows in a predetermined direction (a positive direction in this embodiment).

The diode 214 and the first reset resistor 211 are connected in series. This series connection circuit is connected in parallel to the secondary winding 92 of the current transformer 81.

The diode 214 is connected such that turning-on thereof is curbed when the switching current flows in the predetermined direction. That is, the diode 214 is connected such that the diode 214 is turned on when the switching current flows in a direction (a negative direction in this embodiment) opposite to the predetermined direction.

The first switching element 213 and the second detection resistor 212 are connected in series. This series connection circuit is connected in parallel to the first reset resistor 211.

The positive voltage level shift circuit 251 is connected to a point between the first switching element 213 and the second detection resistor 212.

The positive voltage level shift circuit 251 is connected to the control circuit 41 such that the second detection voltage $V_{CS2}$ is input to the control circuit 41.

An operation example of the current detecting unit 31 will be described below.

When a secondary detected current $I_{CT2}$ of the current transformer 81 flows in the positive direction, the first switching element 213 is turned off (non-electrified) by the control circuit 41. Accordingly, the first detection resistor 231 is used as a detection resistor, and the first reset resistor 211 is used as a reset resistor. At this time, a waveform detected by the first detection resistor 231 is output as a first detection voltage $V_{CS1}$ to the control circuit 41.

On the other hand, when the secondary detected current $I_{CT2}$ of the current transformer 81 flows in the negative direction, the first switching element 213 is turned on (electrified) by the control circuit 41. Accordingly, a parallel combined resistor of the second detection resistor 212 and the first reset resistor 211 is used as a detection resistor, and the first detection resistor 231 is used as a reset resistor. At this time, in a voltage across both ends of the parallel combined resistor of the second detection resistor 212 and the first reset resistor 211, a high-potential side is connected to the grounding end 53, and a negative voltage generated on a low-potential side thereof is output as the second detection voltage $V_{CS2}$ to the control circuit 41 via the positive voltage level shift circuit 251.

The positive voltage level shift circuit 251 converts a waveform detected by the second detection resistor 212 to a waveform of a positive voltage level.

Here, as a circuit that converts a waveform of a negative voltage level to a waveform of a positive voltage level, for example, a circuit that inverts positive and negative polarities of a waveform may be used or a circuit that shifts a level of a voltage of a waveform in a positive direction may be used.

Through this operation, it is possible to accurately detect a current even when a pulse-shaped direct current flows in any of the positive and negative directions on the primary side of the current transformer 81.

When a primary current of the current transformer 81 flows in both the positive and negative directions, the first detection resistor 231 may be used as a detection resistor for the current flowing in the predetermined direction and the second detection resistor 212 may be used as a reset resistor by turning on the first switching element 213 when the switching current flows in the predetermined direction as well as when the switching current flows in the direction opposite to the predetermined direction.

Figure 3:
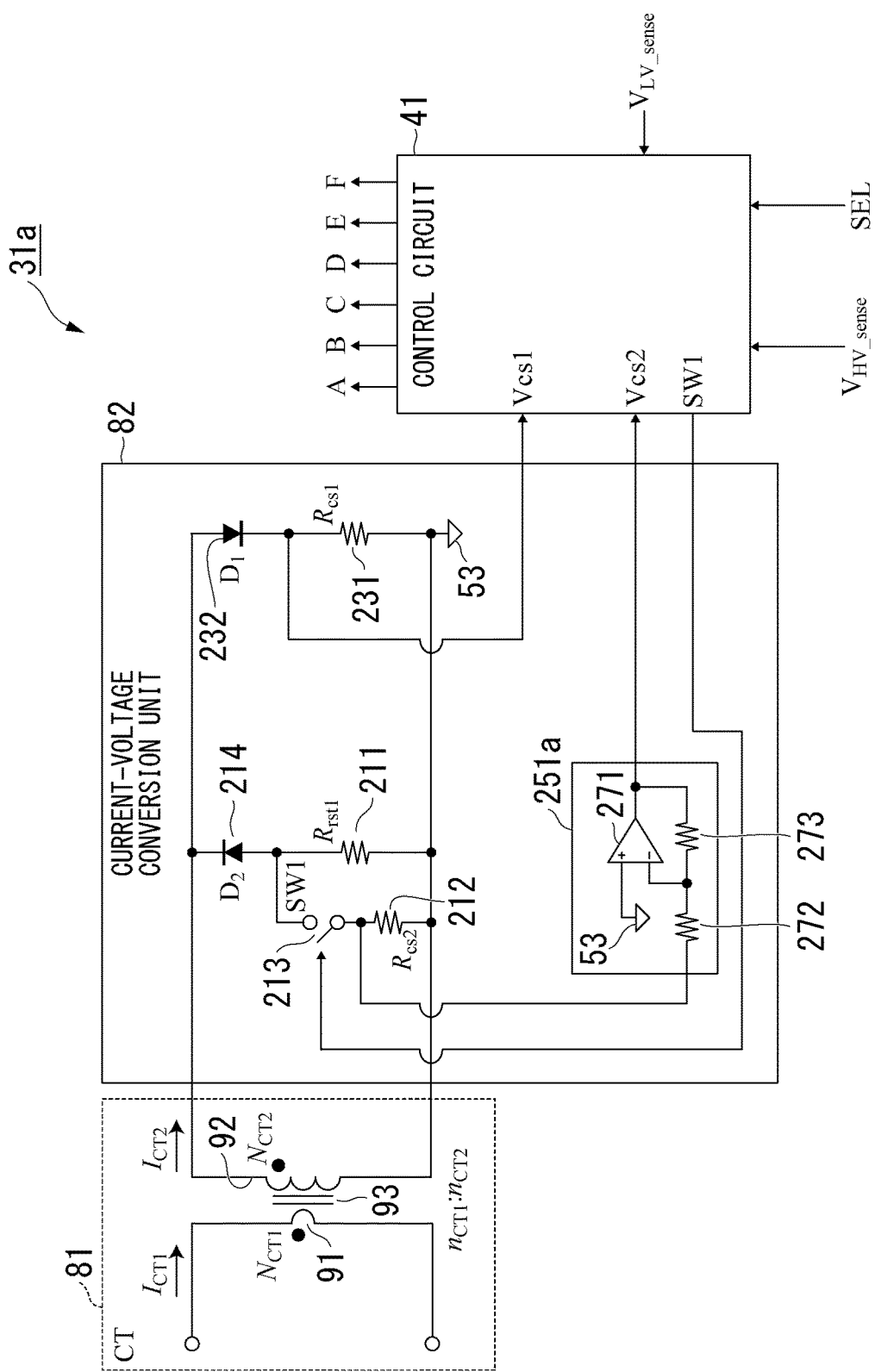
FIG. 3 is a diagram illustrating a configuration of a positive voltage level shift circuit of the current detecting unit according to the first embodiment.

FIG. 3 is a diagram illustrating the configuration of a positive voltage level shift circuit 251*a* of a current detecting unit 31*a* according to the first embodiment.

The current detecting unit 31*a* is a specific example of the current detecting unit 31.

The positive voltage level shift circuit 251*a* is a specific example of the positive voltage level shift circuit 251.

The positive voltage level shift circuit 251*a* is a circuit employing an inverting amplifier circuit. The inverting amplifier circuit includes an operational amplifier 271, a resistor 272, and a resistor 273. Specifically, one end of the resistor 272 is connected to a point between the first switching element 213 and the second detection resistor 212. The other end of the resistor 272 and one end of the resistor 273 are connected, and a point therebetween and a negative input end of the operational amplifier 271 are connected. The other end of the resistor 273 and an output end of the operational amplifier 271 are connected to each other and are connected to the control circuit 41 to supply the second detection voltage $V_{CS2}$. The positive input end of the operational amplifier 271 is connected to the grounding end 53.

Summary of First Embodiment

As described above, with the power system 1 according to this embodiment, it is possible to detect a current in two directions using the current transformer 81 by switching the detection resistor using on a switching element (the first switching element 213) on the basis of the operation state of the DC-DC converter 2 in a switching power source. Accordingly, even when a pulse-shaped direct current flows in any of the positive and negative directions on the primary side of the current transformer 81 in the current detecting unit 31, it is possible to accurately detect the current.

With the current detecting unit 31 according to this embodiment, it is possible to minutely adjust characteristics when a current flowing in two directions in the current transformer 81 is detected.

With the current detecting unit 31 according to this embodiment, the detection resistor (the first detection resistor 231, the second detection resistor 212, and the first reset resistor 211 used as a detection resistor) and the reset resistor (the first reset resistor 211 and the first detection resistor 231 used as a reset resistor) are switched depending on the direction of the current in the secondary circuit of the current transformer 81 (the current-voltage conversion unit 82 in this embodiment). Accordingly, the functions of the detection resistor and the reset resistor are switched depending on the direction of the secondary current $I_{CT2}$ of the current transformer 81.

Accordingly, with the current detecting unit 31, it is possible to make a resistance value of a detection resistor vary between in the forward operation and in the reverse operation and to select a resistor having an optimal resistance value as the detection resistor in the operations. As a result, it is possible to minutely adjust a detection level in the operations using the resistance value.

With the current detecting unit 31, it is possible to make a resistance value of a reset resistor vary between in the forward operation and in the reverse operation and to select a resistor having an optimal resistance value as the reset resistor in the operations. As a result, it is possible to minutely adjust reliable reset in the operations using the resistance value.

By switching the reset resistor in the operations, it is possible to avoid nonlinearity of characteristics, for example, in relationships between a load current and a peak value of a detection voltage when a load is light. Here, when the load is light, a current may flow in two directions even when the direction of the current $I_{CT1}$ flowing on the primary side of the current transformer 81 is positive or negative.

Figure 5:
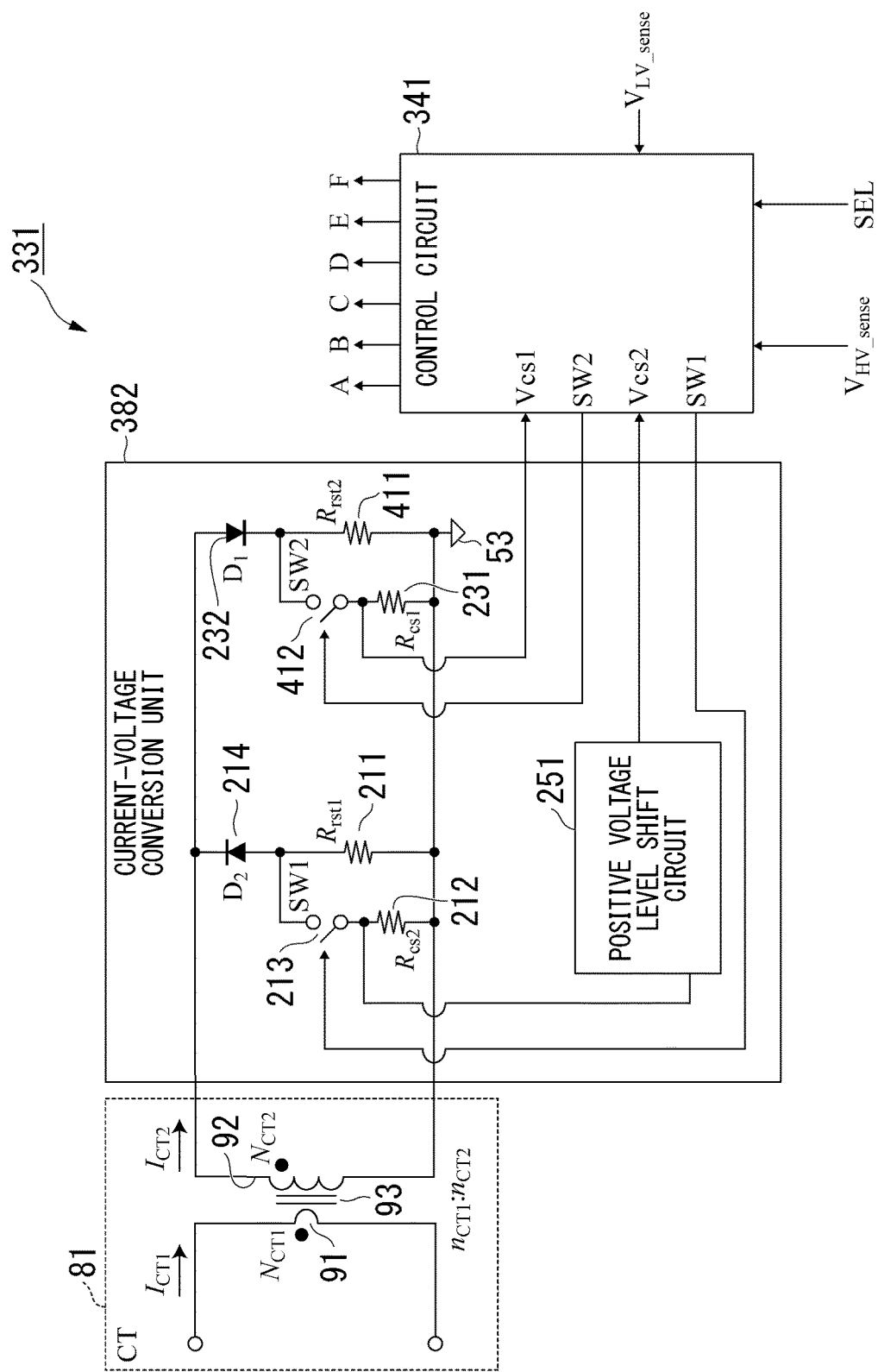
FIG. 5 is a diagram illustrating a configuration of a current detecting unit according to the second embodiment.

In the example illustrated in FIG. 2 according to the first embodiment, a second reset resistor 411 and a second switching element 412 for switching the reset resistor in the reverse operation are omitted from the example illustrated in FIG. 5 according to a second embodiment.

For example, when a period $T_{off2}$ in FIG. 7 according to the second embodiment is sufficiently long, a sufficient reset time can be secured for resetting the current transformer 81 at the time of operating in reverse and thus the configuration illustrated in FIG. 2 according to the first embodiment is effective.

For example, when a charging current of the DC power source 11 at the time of operating in reverse is small, the configuration illustrated in FIG. 2 according to the first embodiment is effective.

In this way, with the current detecting unit 31 illustrated in FIG. 2 according to the first embodiment, a range of an available current or voltage is narrow but the number of components can be decreased in comparison with the example illustrated in FIG. 5 according to the second embodiment.

Here, as the first switching element 213, for example, a semiconductor switching element such as a MOS-FET or a bipolar transistor may be used, a mechanical switching element may be used, or a photo coupler may be used. When a MOS-FET is used, the MOS-FET is connected between two ends of the secondary winding 92 of the current transformer 81 such that the polarities of a built-in body diode of the MOS-FET are opposite to the polarities of the diodes 214 and 232 which are connected in series. An arbitrary driving method may be used as a method of driving such switching elements.

For example, an inverting amplifier circuit or a differential amplifier circuit using an operational amplifier can be applied to the positive voltage level shift circuit 251, but the present disclosure is not limited thereto.

An amplifier circuit with a common emitter using a bipolar transistor may be used, and its function may be used when the function is incorporated into a control circuit in the control circuit 41.

Second Embodiment

In a second embodiment, differences from the first embodiment will be described in detail and detailed description of the same elements as in the first embodiment will be omitted.

Power System

Figure 4:
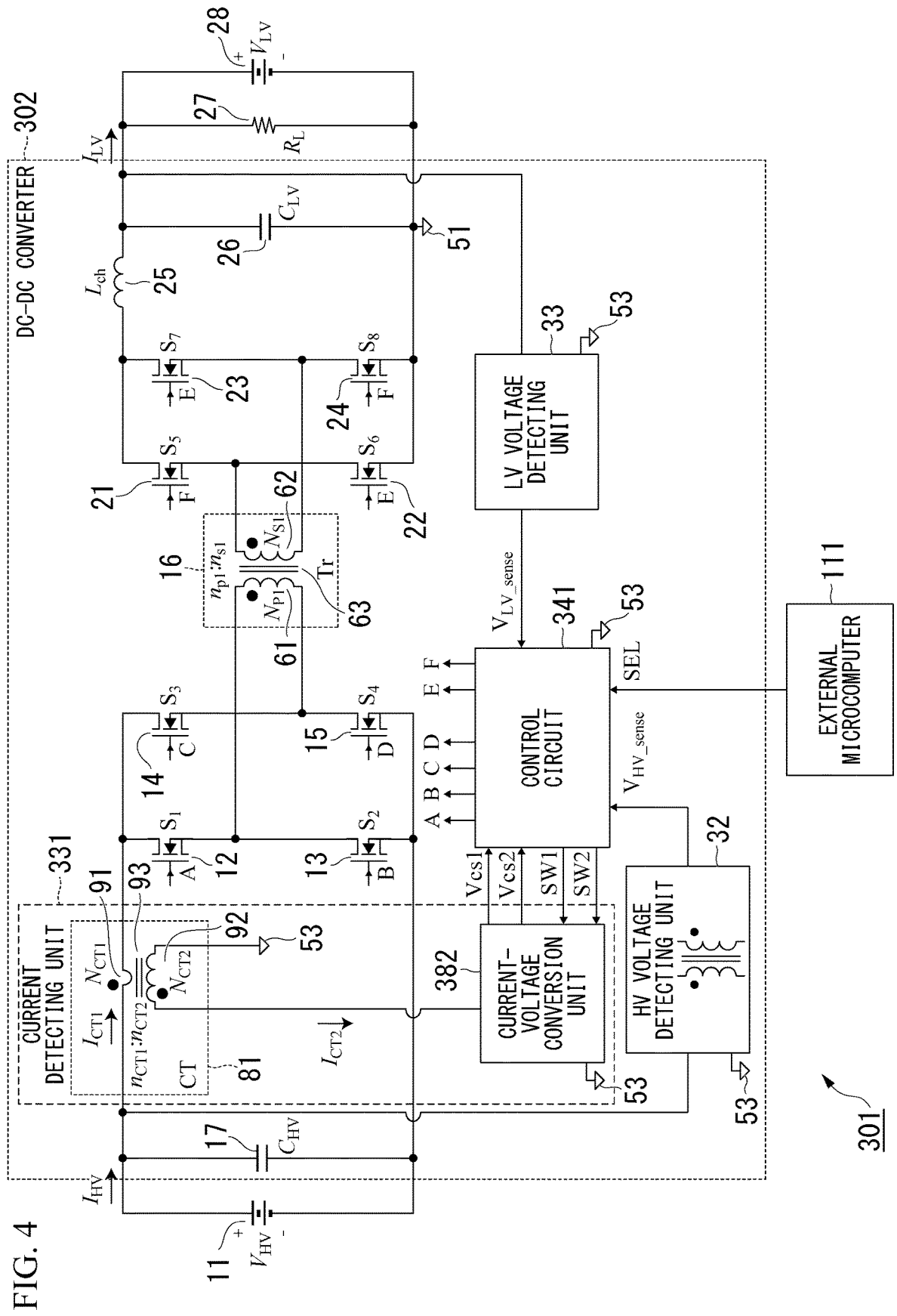
FIG. 4 is a diagram illustrating a configuration of a power system according to a second embodiment.

FIG. 4 is a diagram illustrating a configuration of a power system 301 according to the second embodiment.

In FIG. 4, the same constituents as in the power system 1 illustrated in FIG. 1 will be referred to by the same reference signs and detailed description thereof will be omitted for the purpose of convenience of description.

The example illustrated in FIG. 4 according to the second embodiment is different from the example illustrated in FIG. 1 according to the first embodiment in the configuration of a current-voltage conversion unit 382 and control performed by a control circuit 341, and thus both are different in a current detecting unit 331 and a DC-DC converter 302.

In this embodiment, the control circuit 341 also outputs a switch switching signal SW2 to the current-voltage conversion unit 382.

Current Detecting Unit

FIG. 5 is a diagram illustrating the configuration of the current detecting unit 331 according to the second embodiment.

In FIG. 5, the same constituents as in the current detecting unit 31 illustrated in FIG. 2 will be referred to by the same reference signs and detailed description thereof will be omitted for the purpose of convenience of description.

The current-voltage conversion unit 382 illustrated in FIG. 5 is different from that in the example illustrated in FIG. 2 in that a second reset resistor 411 (a second reset resistor $R_{rst2}$) and a second switching element 412 are provided. The control circuit 341 is different from that in the example illustrated in FIG. 2 in that the second switching element 412 is also controlled.

In the example illustrated in FIG. 5, the diode 232 and the second reset resistor 411 are connected in series. This series connection circuit is connected in parallel to the secondary winding 92 of the current transformer 81.

The second switching element 412 and the first detection resistor 231 are connected in series. This series connection circuit is connected in parallel to the second reset resistor 411.

In a voltage across two ends of the parallel combined resistor of the first detection resistor 231 and the second reset resistor 411, a low-potential end is connected to the grounding end 53, and a high-potential end is connected to the control circuit 341 such that a positive voltage generated at the high-potential end is input as the first detection voltage $V_{CS1}$ to the control circuit 341.

An operation example of the current detecting unit 331 will be described below.

When a secondary detected current $I_{CT2}$ of the current transformer 81 flows in the positive direction, the first switching element 213 is turned off (non-electrified) and the second switching element 412 is turned on (electrified) by the control circuit 341. Accordingly, the parallel combined resistor of the first detection resistor 231 and the second reset resistor 411 are used as a detection resistor, and the first reset resistor 211 is used as a reset resistor. At this time, a waveform detected by the parallel combined resistor of the first detection resistor 231 and the second reset resistor 411 is output as a first detection voltage $V_{CS1}$ to the control circuit 341.

On the other hand, when the secondary detected current $I_{CT2}$ of the current transformer 81 flows in the negative direction, the first switching element 213 is turned on (electrified) and the second switching element 412 is turned off (non-electrified) by the control circuit 341. Accordingly, a parallel combined resistor of the second detection resistor 212 and the first reset resistor 211 is used as a detection resistor, and the second reset resistor 411 is used as a reset resistor. At this time, in a voltage across both ends of the parallel combined resistor of the second detection resistor 212 and the first reset resistor 211, a high-potential end is connected to the grounding end 53, and a negative voltage generated on a low-potential end thereof is output as the second detection voltage $V_{CS2}$ to the control circuit 341 via the positive voltage level shift circuit 251.

The positive voltage level shift circuit 251 converts a waveform detected by the second detection resistor 212 to a waveform of a positive voltage level.

Through this operation, it is possible to accurately detect a current even when a pulse-shaped direct current flows in any of the positive and negative directions on the primary side of the current transformer 81.

When the primary current $I_{CT1}$ and the secondary detected current $I_{CT2}$ of the current transformer 81 flow in both the positive and negative directions, the first switching element 213 and the second switching element 412 may be turned on, one of the parallel combined resistor of the first detection resistor 231 and the second reset resistor 411 and the parallel combined resistor of the second detection resistor 212 and the first reset resistor 211 may be used as a detection resistor, and the other thereof may be used as a reset resistor, by the control circuit 341, whereby it may be possible to improve linearity of load current detection when a load of a main circuit is light. In this case, at the time of operating forward, the parallel combined resistor of the first detection resistor 231 and the second reset resistor 411 is used as the detection resistor, and the parallel combined resistor of the second detection resistor 212 and the first reset resistor 211 is used as the reset resistor. On the other hand, at the time of operating in reverse, the parallel combined resistor of the first detection resistor 231 and the second reset resistor 411 is used as the reset resistor and the parallel combined resistor of the second detection resistor 212 and the first reset resistor 211 is used as the detection resistor. This control may not be necessarily performed.

In this embodiment, the main circuit is a circuit from which a current is detected by the current detecting unit 331 and is a part obtained by removing the circuit of the current detecting unit 331 from the circuit of the DC-DC converter 2.

Waveform of Forward Operation

A forward operation (an operation of transmitting electric power from the primary side to the secondary side in this embodiment) will be described below.

In the forward operation, charging of an auxiliary-machine battery which is a power source $V_{LV}$ with electric power from a high-voltage battery which is the power source $V_{HV}$ via the DC-DC converter 302 and supply of electric power to a vehicle load are performed.

In FIG. 6, (A) to (G) are diagrams illustrating operation waveforms of the constituents according to the second embodiment. FIG. 6(A) illustrates an operation waveform 1011 indicating turning-on/off timings of the FET 12. FIG. 6(B) illustrates an operation waveform 1012 indicating turning-on/off timings of the FET 13. FIG. 6(C) illustrates an operation waveform 1013 indicating turning-on/off timings of the FET 14. FIG. 6(D) illustrates an operation waveform 1014 indicating turning-on/off timings of the FET 15. FIG. 6(E) illustrates an operation waveform 1015 of the primary current $I_{CT1}$ in the current detecting unit 331.

FIG. 6(F) illustrates an operation waveform 1016 of the first detection voltage $V_{CS1}$ in the current detecting unit 331.

FIG. 6(G) illustrates an operation waveform 1017 of the second detection voltage $V_{CS2}$ in the current detecting unit 331.

In this embodiment, there are four modes based on combinations of the turning-on/off timings of four FETs 12 to 15.

Mode 1-1 (Mode1-1) is a mode of a period in which the FET 12 (which is indicated by S1 in FIG. 6: control voltage A for a switching element) and the FET 15 (which is indicated by S4 in FIG. 6: control voltage D for a switching element) are in the ON state.

Mode 1-2 (Mode1-2) is a mode of a period in which the FET 12 (which is indicated by S1 in FIG. 6: control voltage A for a switching element) and the FET 14 (which is indicated by S3 in FIG. 6: control voltage C for a switching element) are in the ON state.

Mode 1-3 (Mode1-3) is a mode of a period in which the FET 13 (which is indicated by S2 in FIG. 6: control voltage B for a switching element) and the FET 14 (which is indicated by S3 in FIG. 6: control voltage C for a switching element) are in the ON state.

Mode 1-4 (Mode1-4) is a mode of a period in which the FET 13 (which is indicated by S2 in FIG. 6: control voltage B for a switching element) and the FET 15 (which is indicated by S4 in FIG. 6: control voltage D for a switching element) are in the ON state.

Here, a pulse which is high (hereinafter referred to as Hi) in Mode 1-1 and Mode 1-3 and which is low (hereinafter referred to as Lo) in Mode 1-2 and Mode 1-4 is defined as a PWM pulse.

The length of Mode 1-1 and the length of Mode 1-3 are a time $T_{on1}$.

The length of Mode 1-2 and the length of Mode 1-4 are a time $T_{off1}$.

The sum of time $T_{on1}$ and time $T_{on2}$ is a time $T_{SW1-2}$ of one PWM period.

The sum of the time lengths of Modes 101 to 1-4 is time $T_{SW1-1}$ of one period of each switching element.

In a steady state, Duty1 of the FETs 12 to 14 used to determining the turning-on/off timings of the four FETs 12 to 15 is fixed to 50%.

In this embodiment, phase shift control is performed as a voltage control method. In reality, a dead time which is a micro period in which both the FET 12 and the FET 13 are turned off and both the FET 14 and FET 15 are turned off is generally provided between the timings of turning-off of the FET 12 and turning-on of the FET 13, turning-on of the FET 12 and turning-off of the FET 13, turning-off of the FET 14 and turning-on of the FET 15, and turning-on of the FET 14 and turning-off of the FET 15, but the dead times will not be ignored for the purpose of simplification of description in this embodiment.

A synchronous rectification operation can be performed using turning-on/off of the FET 22 (the control voltage E for a switching element) and the FET 23 (the control voltage E for a switching element) and turning-on/off of the FET 21 (the control voltage F for a switching element) and the FET 24 (the control voltage F for a switching element) in combination, but it is assumed in this embodiment that an on-time period is not provided therefor and the FETs are operated using body diodes for the purpose of simplification of description.

In Mode 1-1, when the FET 12 and the FET 15 are turned on, the voltage $V_{HV}$ is applied to the primary winding 61 of the transformer 16, the body diodes of the FET 21 and the FET 24 are electrified, electric power is transmitted to the secondary side of the transformer 16, electric power is supplied to the output thereof, and energy is accumulated in the choking coil 25.

In Mode 1-2, the primary current returns through a path including a leakage inductance $L_{1k}$, the primary winding 61, the FET 14, the FET 12, and the leakage inductance $L_{1k}$ using energy accumulated in the leakage inductance $L_{1k}$ of the transformer 16, and the body diodes of the FETs 21 to 24 are electrified to discharge the energy from the choking coil 25 to the output.

In Mode 1-3, when the FET 13 and the FET 14 are turned on, a voltage $(-V_{HV})$ of which the polarities are opposite to those of the voltage $V_{HV}$ is applied to the primary winding 61 of the transformer 16, the body diodes of the FET 22 and the FET 23 are electrified, electric power is transmitted to the secondary side of the transformer 16, electric power is supplied to the output thereof, and energy is accumulated in the choking coil 25.

In Mode 1-4, the primary current returns through a path including the leakage inductance $L_{1k}$, the FET 13, the FET 15, the primary winding 61, and the leakage inductance $L_{1k}$ using the energy accumulated in the leakage inductance $L_{1k}$ of the transformer 16, and the body diodes of the FETs 21 to 24 are electrified to discharge the energy from the choking coil 25 to the output.

The control circuit 341 generates a signal for turning on the second switching element 412 and turning off the first switching element 213. Accordingly, in the periods of Mode 1-1 and Mode 1-3 in which the primary current $I_{CT1}$ of the current transformer 81 flows, the secondary detected current $I_{CT2}$ flows in the positive direction, the diode 232 is electrified, a current flows in the first detection resistor 231 and the second reset resistor 411, and thus the current is converted to the first detection voltage $V_{CS1}$ and is input to the control circuit 341.

On the other hand, in the periods of Mode 1-2 and Mode 1-4 in which an input current does not flow, the primary current $I_{CT1}$ of the current transformer 81 does not flow. In the periods, the detected current $I_{CT2}$ flows in the negative direction, the diode 232 is non-electrified, and the diode 214 is electrified, and thus magnetic reset of the current transformer 81 is performed using the first reset resistor 211.

As a result, the current detecting unit 331 can accurately detect the current in the forward operation.

Waveform of Reverse Operation

A reverse operation will be described below.

At the time of operating in reverse, charging of the high-voltage battery which is the power source $V_{HV}$ with electric power from the auxiliary-machine battery which is the power source $V_{LV}$ via the DC-DC converter 302 is performed.

In FIG. 7, (H) to (L) are diagrams illustrating operation waveforms of the constituents according to the second embodiment. FIG. 7(H) illustrates an operation waveform 1018 indicating turning-on/off timings of the FET 22 and the FET 23.

FIG. 7(I) illustrates an operation waveform 1019 indicating turning-on/off timings of the FET 21 and the FET 24.

FIG. 7(J) illustrates an operation waveform 1020 of the primary current $I_{CT1}$ in the current detecting unit 31.

FIG. 7(K) illustrates an operation waveform 1021 of the first detection voltage $V_{CS1}$ in the current detecting unit 31.

FIG. 7(L) illustrates an operation waveform 1022 of the second detection voltage $V_{CS2}$ in the current detecting unit 31.

In this embodiment, there are four modes based on combinations of the turning-on/off timings of four FETs 21 to 24.

Mode 2-1 (Mode2-1) is a mode of a period in which all of the FET 22 (which is indicated by S6 in FIG. 7: control voltage E for a switching element), the FET 23 (which is indicated by S7 in FIG. 7: control voltage E for a switching element), the FET 21 (which is indicated by S5 in FIG. 7: control voltage F for a switching element), and the FET 24 (which is indicated by S8 in FIG. 7: control voltage F for a switching element) are in the ON state.

Mode 2-2 (Mode2-2) is a mode of a period in which both the FET 22 (which is indicated by S6 in FIG. 7: control voltage E for a switching element) and the FET 23 (which is indicated by S7 in FIG. 7: control voltage E for a switching element) are in the ON state.

Mode 2-3 (Mode2-3) is a mode of a period in which all of the FET 22 (which is indicated by S6 in FIG. 7: control voltage E for a switching element), the FET 23 (which is indicated by S7 in FIG. 7: control voltage E for a switching element), the FET 21 (which is indicated by S5 in FIG. 7: control voltage F for a switching element), and the FET 24 (which is indicated by S8 in FIG. 7: control voltage F for a switching element) are in the ON state.

Mode 2-4 (Mode2-4) is a mode of a period in which both the FET 21 (which is indicated by S5 in FIG. 7: control voltage F for a switching element) and the FET 24 (which is indicated by S8 in FIG. 7: control voltage F for a switching element) are in the ON state.

In a steady state, the turning-on/off timings of the FETs 21 to 24 are determined by signals of the control voltage E and the control voltage F.

A synchronous rectification operation can be performed using turning-on/off of the FETs 12 to 15 in combination, but it is assumed in this embodiment that an on-time period is not provided therefor and the FETs are operated using the body diodes for the purpose of simplification of description.

In Mode 2-1, when the FETs 21 to 24 are turned on, one end of the choking coil 25 is short-circuited to the ground (GND), a DC voltage $V_{LV}$ is applied to the choking coil 25, and energy is accumulated therein.

In Mode 2-2, when the FET 21 and the FET 24 are turned off, the choking coil 25 operates as a current source, and a current flows through a path including the choking coil 25, the FET 23, the secondary winding 62 of the transformer 16, the FET 22, the voltage $V_{LV}$, and the choking coil 25. At this time, on the primary side of the transformer 16, the body diodes of the FET 13 and the FET 14 are electrified and a current flows through a path including the primary winding 61 of the transformer 16, the FET 14, the primary winding 91 of the current transformer 81, the voltage $V_{HV}$, the FET 13, and the primary winding 61 of the transformer 16. Accordingly, electric power is transmitted to the primary side of the transformer 16.

In Mode 2-3, when the FETs 21 to 24 are turned on, one end of the choking coil 25 is short-circuited to the ground (GND), a DC voltage $V_{LV}$ is applied to the choking coil 25, and energy is accumulated therein.

In Mode 2-4, when the FET 22 and the FET 23 are turned off, the choking coil 25 operates as a current source, and a current flows through a path including the choking coil 25, the FET 21, the secondary winding 62 of the transformer 16, the FET 24, the voltage $V_{LV}$, and the choking coil 25. At this time, on the primary side of the transformer 16, the body diodes of the FET 12 and the FET 15 are electrified and a current flows through a path including the primary winding 61 of the transformer 16, the FET 12, the primary winding 91 of the current transformer 81, the voltage $V_{HV}$, the FET 15, and the primary winding 61 of the transformer 16. Accordingly, electric power is transmitted to the primary side of the transformer 16.

The control circuit 341 generates a signal for turning on the first switching element 213 and turning off the second switching element 412. Accordingly, in the periods of Mode 2-2 and Mode 2-4 in which the primary current $I_{CT1}$ of the current transformer 81 flows, the secondary detected current $I_{CT2}$ flows in the negative direction, the diode 214 is electrified, and a current flows in the second detection resistor 212 and the first reset resistor 211. As a result, the current generates a negative voltage serving as a basis of the second detection voltage $V_{CS2}$. When the negative voltage is changed to a positive voltage by the positive voltage level shift circuit 251, the voltage is converted to the second detection voltage $V_{CS2}$ and is input to the control circuit 341.

On the other hand, in the periods of Mode 2-1 and Mode 2-3 in which an input current does not flow, the primary current $I_{CT1}$ of the current transformer 81 does not flow. In the periods, the detected current $I_{CT2}$ flows in the positive direction, the diode 214 is non-electrified, and the diode 232 is electrified, and thus magnetic reset of the current transformer 81 is performed using the second reset resistor 411.

As a result, the current detecting unit 331 can accurately detect the current in the reverse operation.

Control Circuit

A method of determining the switch switching signal SW1 and the switch switching signal SW2 and a method of applying the first detection voltage $V_{CS1}$ and the second detection voltage $V_{CS2}$ will be described below with reference to FIG. 8.

The control circuit 41 receives an input of the mode selection signal SEL, the voltage $V_{LV\_sense}$ which is a sensed LV voltage value, the first detection voltage $V_{CS1}$, the voltage $V_{HV\_sense}$ which is a sensed HV voltage value, and the second detection voltage $V_{CS2}$ and outputs the control voltages A to D and the control voltages E to F which are the generated pulses, the switch switching signal SW1, and the switch switching signal SW2.

FIG. 8 is a diagram illustrating the configuration of the control circuit 341 according to the second embodiment.

The control circuit 341 includes a reference power source 511, an error amplifier 512 (E/A), a slope voltage source 513, an adder 514, a comparator 515, a reference pulse generator 516, a pulse generator 517, a reference power source 531, an error amplifier (E/A) 532, a reference pulse generator 533, a pulse generator 534, a short-circuit current protection unit 551, a NOR circuit 552, and a mode selecting unit 571.

The error amplifier 512 amplifies a difference between a reference voltage $V_{ref1}$ supplied from the reference power source 511 and the voltage $V_{LV\_sense}$.

In the example illustrated in FIG. 8, the reference voltage $V_{ref1}$ is input to a positive input end of the error amplifier 512, and the voltage $V_{LV\_sense}$ is input to a negative input end of the error amplifier 512. Here, the negative end of the reference power source 511 is connected to the grounding end 53.

The adder 514 adds a slope compensation voltage $V_{slope}$ supplied from the slope voltage source 513 to the first detection voltage $V_{CS1}$.

The comparator 515 compares the output of the adder 514 with the output of the error amplifier 512.

In the example illustrated in FIG. 8, the addition result from the adder 514 is input to a positive input end of the comparator 515, and the output of the error amplifier 512 is input to a negative input end of the comparator 515.

An enable signal EN1 output from the mode selecting unit 571 is input to an enable end (EN) of the pulse generator 517.

The pulse generator 517 operates when it is enabled by the enable signal EN1. The enable signal EN1 is a Hi (high) or Lo (low) signal. The pulse generator 517 stops the operation when the input enable signal is a Lo signal, and the operation of the main circuit stops for a predetermined period.

The pulse generator 517 receives an input of the output of the comparator 515 and timing information of a reference pulse $V_{base}$ (the reference voltage) output from the reference pulse generator 516, generates a pulse signal used to drive the gates of the FETs 12 to 15 on the basis thereof, and outputs the generated pulse signal to the gates of the FETs 12 to 15. Accordingly, a current mode in the main circuit of the DC-DC converter 302 is controlled. For example, general control may be performed as the control of the current mode.

In the example illustrated in FIG. 8, the output of the comparator 515 and the reference pulse $V_{base}$ are input to an input end of the pulse generator 517.

The error amplifier 532 amplifies a difference between a reference voltage $V_{ref2}$ supplied from the reference power source 531 and the voltage $V_{HV\_sense}$.

In the example illustrated in FIG. 8, the reference voltage $V_{ref2}$ is input to a positive input end of the error amplifier 532, and the voltage $V_{HV\_sense}$ is input to a negative input end of the error amplifier 532. Here, the negative end of the reference power source 531 is connected to the grounding end 53.

An enable signal EN2 output from the NOR circuit 552 is input to an enable end (EN) of the pulse generator 534.

The pulse generator 534 operates when it is enabled by the enable signal EN2.

The pulse generator 534 receives an input of the output of the error amplifier 532 and timing information of a reference pulse $V_s$ (a reference voltage which is a triangular voltage) output from the reference pulse generator 533, generates a pulse signal used to drive the gates of the FETs 21 to 24 on the basis thereof, and outputs the generated pulse signal to the gates of the FETs 21 to 24. Accordingly, a current mode in the main circuit of the DC-DC converter 302 is controlled. For example, general control may be performed as the control of the current mode.

In the example illustrated in FIG. 8, the output of the error amplifier 532 and the reference pulse $V_s$ are input to an input end of the pulse generator 534.

The second detection voltage $V_{CS2}$ is input to an input end of the short-circuit current protection unit 551.

Here, for example, a detection threshold value and a return threshold value are set in advance in the short-circuit current protection unit 551.

The short-circuit current protection unit 551 is configured to switch an enable signal to be output from Hi to Lo when the input second detection voltage $V_{CS2}$ is greater than the predetermined detection threshold value. Thereafter, the short-circuit current protection unit 551 is configured to switch the enable signal to be output from Lo to Hi when the input second detection voltage $V_{CS2}$ is less than the predetermined return threshold value.

For example, a comparator is used as the short-circuit current protection unit 551, but the present disclosure is not limited thereto.

The NOR circuit 552 receives an input of the enable signal output from the short-circuit current protection unit 551 and the enable signal output from the mode selecting unit 571 and outputs an enable signal EN2 in response thereto to the pulse generator 534. Accordingly, the enable signal output from the mode selecting unit 571 and the enable signal output from the short-circuit current protection unit 551 are input to the enable end (EN) of the pulse generator 534.

The pulse generator 534 stops its operation when the input enable signal is a Lo signal, and the operation of the main circuit stops for a predetermined period.

The mode selecting unit 571 selects one of the forward operation and the reverse operation.

The mode selecting unit 571 receives the selection signal SEL output from the external microcomputer 111. Then, the mode selecting unit 571 outputs the switch switching signal SW1 and the switch switching signal SW2 on the basis of a value of the input selection signal SEL.

Here, the external microcomputer 111 outputs a Hi signal as the selection signal when it is intended to instruct the forward operation and outputs a Lo signal as the selection signal SEL when it is intended to instruct the reverse operation.

When the Hi selection signal SEL is input, the mode selecting unit 571 sets the switch switching signal SW1 for the first switching element 213 to Lo, sets the switch switching signal SW2 for the second switching element 412 to Hi, sets the enable signal EN1 for the pulse generator 517 to Hi, and sets the enable signal for the pulse generator 534 (a signal which becomes the enable signal EN2) to Lo as the forward operation.

On the other hand, when the Lo selection signal SEL is input, the mode selecting unit 571 sets the switch switching signal SW1 for the first switching element 213 to Hi, sets the switch switching signal SW2 for the second switching element 412 to Lo, sets the enable signal EN1 for the pulse generator 517 to Lo, and sets the enable signal for the pulse generator 534 (a signal which becomes the enable signal EN2) to Hi as the reverse operation.

Accordingly, the control circuit 41 detects the first detection voltage $V_{CS1}$ and generates the pulse-shaped control voltages A to D in the forward operation. The control circuit 41 detects the second detection voltage $V_{CS2}$ and generates the pulse-shaped control voltages E to F in the reverse operation.

While the method of determining the switch switching signal SW1 and the switch switching signal SW2 and the method of applying the first detection voltage $V_{CS1}$ and the second detection voltage $V_{CS2}$ have been described above with reference to FIG. 8, the determination method and the application method are not limited thereto.

Summary of Second Embodiment

As described above, with the power system 301 according to this embodiment, it is possible to detect a current in two directions using the current transformer 81 by switching the switching element (the first switching element 213 and the second switching element 412) on the basis of the operation state of the DC-DC converter 302 in a switching power source. Accordingly, even when a pulse-shaped direct current flows in any of the positive and negative directions on the primary side of the current transformer 81 in the current detecting unit 331, it is possible to accurately detect the current.

With the current detecting unit 31 according to this embodiment, it is possible to minutely adjust characteristics when a current flowing in two directions in the current transformer 81 is detected.

With the current detecting unit 331 according to this embodiment, the detection resistor (the first detection resistor 231 and the second detection resistor 212) and the reset resistor (the first reset resistor 211 and the second reset resistor 411) are switched depending on the direction of the current in the secondary circuit of the current transformer 81 (the current-voltage conversion unit 382 in this embodiment). Accordingly, the detection resistor and the reset resistor are switched depending on the direction of the secondary current $I_{CT2}$ of the current transformer 81.

Accordingly, with the current detecting unit 331, it is possible to make a resistance value of a detection resistor vary between in the forward operation and in the reverse operation and to select a resistor having an optimal resistance value as the detection resistor in the operations. As a result, it is possible to minutely adjust characteristics in the operations using the resistance value.

With the current detecting unit 331, it is possible to make a resistance value of a reset resistor vary between in the forward operation and in the reverse operation and to select a resistor having an optimal resistance value as the reset resistor in the operations. As a result, it is possible to minutely adjust characteristics in the operations using the resistance value.

By switching the reset resistor in the operations, it is possible to avoid nonlinearity of characteristics due to a magnetic bias of the current transformer (a phenomenon which occurs because of insufficient reset), for example, using relationships between a load current and a peak value of a detection voltage when a load is light.

In the example illustrated in FIG. 5 according to the second embodiment, the second reset resistor 411 and the second switching element 412 for switching the reset resistor in the reverse operation are added to the example illustrated in FIG. 2 according to the first embodiment.

For example, when a period $T_{off2}$ in FIG. 7 according to the second embodiment is short, the configuration illustrated in FIG. 5 according to the second embodiment is effective.

For example, when a charging current of the DC power source 11 in the reverse operation is large, the configuration illustrated in FIG. 5 according to the second embodiment is effective.

In this way, with the current detecting unit 331 illustrated in FIG. 5 according to the second embodiment, the number of components can be increased but the range of an available current or voltage is broad in comparison with the example illustrated in FIG. 2 according to the first embodiment.

In this embodiment, the same circuit elements (for example, resistors) in the example illustrated in FIG. 2 and the example illustrated in FIG. 5 have been referred to by the same reference signs for the purpose of convenience of description, but different values may be used for characteristics (for example, resistance values) of the circuit elements.

Here, as the second switching element 412, for example, a semiconductor switching element such as an N-channel MOS-FET or an NPN transistor may be used, a mechanical switching element may be used, or a photo coupler may be used. An arbitrary driving method may be used as a method of driving such switching elements.

Third Embodiment

In a third embodiment, differences from the second embodiment will be described in detail and detailed description of the same elements as in the second embodiment will be omitted.

Current Detecting Unit

FIG. 9 is a diagram illustrating the configuration of a current detecting unit 611 according to the third embodiment.

In FIG. 9, the same constituents as in the current detecting unit 331 illustrated in FIG. 5 will be referred to by the same reference signs and detailed description thereof will be omitted for the purpose of convenience of description.

The current detecting unit 611 is a specific example of the current detecting unit 331.

A positive voltage level shift circuit 631 is a specific example of the positive voltage level shift circuit 251.

In the example illustrated in FIG. 9, the positive voltage level shift circuit 631 includes a resistor 651, a resistor 652, and a capacitor 653. In the positive voltage level shift circuit 631, a circuit in which a high-pass filter and a DC bias circuit are combined is constructed using the resistors 651 and 652, the capacitor 653, and a source voltage (a voltage $V_{dd}$).

Specifically, the resistor 651 and the resistor 652 are connected in series between the source voltage (the voltage $V_{dd}$) and the grounding end 53.

A point between the resistor 651 and the resistor 652 and a point between the second detection resistor 212 and the second switching element 412 are connected via the capacitor 653.

The point between the resistor 651 and the resistor 652 is connected to the control circuit 341 such that the second detection voltage $V_{CS2}$ is input to the control circuit 341.

Here, a voltage across two ends of the second detection resistor 212 is a negative voltage. Accordingly, the positive voltage level shift circuit 631 converts the second detection voltage $V_{CS2}$ to a positive voltage by cutting a DC component of the voltage using a capacitor and DC-biasing a positive power source. As a result, a positive voltage is input as the second detection voltage $V_{CS2}$ to the control circuit 341.

Waveforms of Reverse Operation

In FIG. 10, (H1) to (L1) are diagrams illustrating operation waveforms of the constituents according to the third embodiment.

FIG. 10(H1) illustrates an operation waveform 2012 indicating the turning-on/off timings of the FET 22 and the FET 23.

FIG. 10(I1) illustrates an operation waveform 2012 indicating the turning-on/off timings of the FET 21 and the FET 24.

FIG. 10(J1) illustrates an operation waveform 2013 of the primary current $I_{CT1}$ in the current detecting unit 611.

FIG. 10(K1) illustrates an operation waveform 2014 of the first detection voltage $V_{CS1}$ in the current detecting unit 611.

FIG. 10(L1) illustrates an operation waveform 2015 of the second detection voltage $V_{CS2}$ in the current detecting unit 611.

In this embodiment, there are four modes based on combinations of the turning-on/off timings of four FETs 21 to 24.

The four modes are the same as the four modes illustrated in FIG. 7.

As in this embodiment, when the high-pass filter and the DC bias circuit are used for the positive voltage level shift circuit 631, the detection waveforms illustrated in FIG. 10(L1) are detected. The detection waveforms are different from the waveforms when the polarities are inverted by the inverting amplifier circuit as illustrated in FIG. 7(L).

In view of such operation waveforms, the method according to this embodiment is considered to be mainly used for a configuration in which a pulse is stopped to perform protection when the second detection voltage $V_{CS2}$ is less than a certain threshold value, but the present disclosure is not limited thereto.

Summary of Third Embodiment

As described above, with the power system 301 according to this embodiment, it is possible to achieve the same advantages as in the second embodiment.

Summary of Aforementioned Embodiments

Examples of Configuration

As an example of a configuration (the examples illustrated in FIGS. 2, 3, 5, and 9), a current detection circuit (a circuit in the current detecting units 31, 31a, 331, and 611 in the examples illustrated in FIGS. 2, 3, 5, and 9) detects a value of a switching current through a detection resistor using a current transformer (the current transformer 81 in the examples illustrated in FIGS. 2, 3, 5, and 9) and detects the value of the switching current by switching the detection resistor and a reset resistor on the basis of a flow direction of the switching current flowing on the primary side of the current transformer.

As an example of a configuration (the example illustrated in FIG. 2), the current detection circuit includes a first diode (the diode 232 in the example illustrated in FIG. 2), a second diode (the diode 214 in the example illustrated in FIG. 2), a first reset resistor (the first reset resistor 211 in the example illustrated in FIG. 2), a first detection resistor (the first detection resistor 231 in the example illustrated in FIG. 2), a second detection resistor (the second detection resistor 212 in the example illustrated in FIG. 2), a first switching element (the first switching element 213 in the example illustrated in FIG. 2), and a positive voltage level shift circuit (the positive voltage level shift circuit 251 in the example illustrated in FIG. 2).

A series connection circuit of the first diode and the first detection resistor is connected in parallel to a secondary winding (the secondary winding 92 in the example illustrated in FIG. 2) of the current transformer.

A series connection circuit of the second diode and the first reset resistor is connected in parallel to the secondary winding of the current transformer.

A series connection circuit of the first switching element and the second detection resistor is connected in parallel to the first reset resistor.

The first diode is connected in a direction in such a way that the first diode is turned on when the switching current flows in a predetermined direction (the positive direction in the example illustrated in FIG. 2).

The second diode is connected in a direction in such a way that turning-on of the second diode is curbed when the switching current flows in the predetermined direction.

The positive voltage level shift circuit is configured to convert a negative voltage which is detected through parallel connection of the second detection resistor and the first reset resistor to a positive voltage level.

As an example of a configuration (the example illustrated in FIG. 2), in the current detection circuit, the first switching element is turned off when the switching current flows in the predetermined direction.

The first switching element is turned on when the switching current flows in a direction opposite to the predetermined direction.

As an example of a configuration (the example illustrated in FIG. 2), in the current detection circuit, when the current flowing on the primary side of the current transformer flows in both the positive and negative directions, the first detection resistor is used as a detection resistor for the current flowing in the predetermined direction and the second detection resistor is used as a reset resistor by turning on the first switching element when the switching current flows in the predetermined direction as well as when the switching current flows in the direction opposite to the predetermined direction.

As an example of a configuration (the example illustrated in FIG. 5), the current detection circuit includes a first diode (the diode 232 in the example illustrated in FIG. 5), a second diode (the diode 214 in the example illustrated in FIG. 5), a first reset resistor (the first reset resistor 211 in the example illustrated in FIG. 5), a second reset resistor (the second reset resistor 411 in the example illustrated in FIG. 5), a first detection resistor (the first detection resistor 231 in the example illustrated in FIG. 5), a second detection resistor (the second detection resistor 212 in the example illustrated in FIG. 5), a first switching element (the first switching element 213 in the example illustrated in FIG. 5), a second switching element (the second switching element 412 in the example illustrated in FIG. 5), and a positive voltage level shift circuit (the positive voltage level shift circuit 251 in the example illustrated in FIG. 5).

A series connection circuit of the first diode and the second reset resistor is connected in parallel to a secondary winding (the secondary winding 92 in the example illustrated in FIG. 5) of the current transformer.

A series connection circuit of the second switching element and the first detection resistor is connected in parallel to the second reset resistor.

A series connection circuit of the second diode and the first reset resistor is connected in parallel to the secondary winding of the current transformer.

A series connection circuit of the first switching element and the second detection resistor is connected in parallel to the first reset resistor.

The first diode is connected in a direction in such a way that the first diode is turned on when the switching current flows in a predetermined direction (the positive direction in the example illustrated in FIG. 5).

The second diode is connected in a direction in such a way that turning-on of the second diode is curbed when the switching current flows in the predetermined direction.

The positive voltage level shift circuit is configured to convert a voltage which is detected through the second reset resistor to a positive voltage level.

As an example of a configuration (the example illustrated in FIG. 5), in the current detection circuit, the first switching element is turned off and the second switching element is turned on when the switching current flows in the predetermined direction.

The first switching element is turned on and the second switching element is turned off when the switching current flows in a direction (the negative direction in the example illustrated in FIG. 5) opposite to the predetermined direction.

As an example of a configuration (the example illustrated in FIG. 5), in the current detection circuit, when the current flowing on the primary side of the current transformer flows in both the positive and negative directions, both the first switching element and the second switching element are turned on, the first detection resistor is used as a detection resistor and the second detection resistor is used as a reset resistor at the time of operating forward, and the first detection resistor is used as a reset resistor and the second detection resistor is used as a detection resistor at the time of operating in reverse.

As an example of a configuration (the example illustrated in FIG. 3 which may be applied to FIG. 5), in the current detection (the current detecting unit 31*a* in the example illustrated in FIG. 3), the positive voltage level shift circuit (the positive voltage level shift circuit 251*a* in the example illustrated in FIG. 3) includes an operational amplifier.

As an example of a configuration (the example illustrated in FIG. 9), in the current detection circuit (the current detecting unit 611 in the example illustrated in FIG. 9), the positive voltage level shift circuit (the positive voltage level shift circuit 631 in the example illustrated in FIG. 9) includes a high-pass filter and a DC bias circuit.

As an example of a configuration (the example illustrated in FIG. 2), in the current detection circuit, the positive voltage level shift circuit includes an amplifier circuit using a transistor.

As an example of a configuration (the examples illustrated in FIGS. 2, 3, 5, and 9), in the current detection circuit, the first switching element is a semiconductor switching element.

As an example of a configuration (the examples illustrated in FIGS. 5 and 9), in the current detection circuit, the second switching element is a semiconductor switching element.

As an example of a configuration (the examples illustrated in FIGS. 1 and 4), a power conversion device (the DC-DC converters 2 and 302 in the examples illustrated in FIGS. 1 and 4) includes the aforementioned current detection circuit.

As an example of a configuration (the examples illustrated in FIGS. 1 and 4), the power conversion device performs a bidirectional operation.

As an example of a configuration (the examples illustrated in FIGS. 1 and 4), a power system (the power systems 1 and 301 in the examples illustrated in FIGS. 1 and 4) includes the power conversion device.

A function of an arbitrary constituent in any of the aforementioned arbitrary device may be implemented by a processor. For example, the processes in the aforementioned embodiments may be implemented by a processor operating on the basis of information such as a program and a computer-readable recording medium storing information such as a program. Here, the processor may implement the functions of the constituents using individual hardware or may implement the functions of the constituents using unified hardware. For example, the processor may include hardware, the hardware may include at least one of a circuit for processing a digital signal and a circuit for processing an analog signal. For example, the processor may be constituted by one or both of one or more circuit devices mounted in a circuit board and one or more circuit elements. An integrated circuit (IC) or the like may be used as the circuit device, and a resistor, a capacitor, or the like may be used as the circuit element.

Here, the processor may be, for example, a CPU. The processor is not limited to a CPU and, for example, various processors such as a graphics processing unit (GPU) and a digital signal processor (DSP) may be used. The processor may be, for example, a hardware circuit such as an application-specific integrated circuit (ASIC). The processor may include, for example, a plurality of CPUs, may include, for example or a hardware circuit including a plurality of ASICs. The processor may be constituted, for example, by a combination of a plurality of CPUs and a hardware circuit including a plurality of ASICs. The processor may include, for example, one or more of an amplifier circuit processing an analog signal and a filter circuit.

While embodiments of the present disclosure have been described above with reference to the drawings, a specific configuration is not limited to the embodiments and includes designs without departing from the gist of the present disclosure.

Configurations

Examples of configurations are shown below.

Configuration 1

A current detection circuit configured to detect a value of a switching current through a detection resistor using a current transformer, wherein the value of the switching current is detected by switching the detection resistor and a reset resistor on the basis of a flow direction of the switching current flowing on a primary side of the current transformer.

Configuration 2

The current detection circuit according to the configuration 1, wherein the current detection circuit includes a first diode, a second diode, a first reset resistor, a first detection resistor, a second detection resistor, a first switching element, and a positive voltage level shift circuit, a series connection circuit of the first diode and the first detection resistor is connected in parallel to a secondary winding of the current transformer, a series connection circuit of the second diode and the first reset resistor is connected in parallel to the secondary winding of the current transformer, a series connection circuit of the first switching element and the second detection resistor is connected in parallel to the first reset resistor, the first diode is connected in a direction in such a way that the first diode is turned on when the switching current flows in a predetermined direction, the second diode is connected in a direction in such a way that turning-on of the second diode is curbed when the switching current flows in the predetermined direction, and the positive voltage level shift circuit is configured to convert a negative voltage which is detected through parallel connection of the second detection resistor and the first reset resistor to a positive voltage level.

Configuration 3

The current detection circuit according to the configuration 2, wherein the first switching element is turned off when the switching current flows in the predetermined direction, and the first switching element is turned on when the switching current flows in a direction opposite to the predetermined direction.

Configuration 4

The current detection circuit according to the configuration 2, wherein, when the current flowing on the primary side of the current transformer flows in both the positive and negative directions, the first detection resistor is used as a detection resistor for the current flowing in the predetermined direction and the second detection resistor is used as a reset resistor by turning on the first switching element when the switching current flows in the predetermined direction as well as when the switching current flows in the direction opposite to the predetermined direction.

Configuration 5

The current detection circuit according to the configuration 1, wherein the current detection circuit includes a first diode, a second diode, a first reset resistor, a second reset resistor, a first detection resistor, a second detection resistor, a first switching element, a second switching element, and a positive voltage level shift circuit, a series connection circuit of the first diode and the second reset resistor is connected in parallel to a secondary winding of the current transformer, a series connection circuit of the second switching element and the first detection resistor is connected in parallel to the second reset resistor, a series connection circuit of the second diode and the first reset resistor is connected in parallel to the secondary winding of the current transformer, a series connection circuit of the first switching element and the second detection resistor is connected in parallel to the first reset resistor, the first diode is connected in a direction in such a way that the first diode is turned on when the switching current flows in a predetermined direction, the second diode is connected in a direction in such a way that turning-on of the second diode is curbed when the switching current flows in the predetermined direction, and the positive voltage level shift circuit is configured to convert a voltage which is detected through the second reset resistor to a positive voltage level.

Configuration 6

The current detection circuit according to the configuration 5, wherein the first switching element is turned off and the second switching element is turned on when the switching current flows in the predetermined direction, and the first switching element is turned on and the second switching element is turned off when the switching current flows in a direction opposite to the predetermined direction.

Configuration 7

The current detection circuit according to the configuration 5 or 6, wherein, when the current flowing on the primary side of the current transformer flows in both the positive and negative directions, both the first switching element and the second switching element are turned on, the first detection resistor is used as a detection resistor and the second detection resistor is used as a reset resistor in a forward operation, and the first detection resistor is used as a reset resistor and the second detection resistor is used as a detection resistor in a reverse operation.

Configuration 8

The current detection circuit according to any one of the configurations 2 to 7, wherein the positive voltage level shift circuit includes an operational amplifier.

Configuration 9

The current detection circuit according to any one of the configurations 2 to 7, wherein the positive voltage level shift circuit includes a high-pass filter and a DC bias circuit.

Configuration 10

The current detection circuit according to any one of the configurations 2 to 7, wherein the positive voltage level shift circuit includes an amplifier circuit using a transistor.

Configuration 11

The current detection circuit according to any one of the configurations 2 to 10, wherein the first switching element is a semiconductor switching element.

Configuration 12

The current detection circuit according to any one of the configurations 5 to 7, wherein the second switching element is a semiconductor switching element.

Configuration 13

A power conversion device comprising the current detection circuit according to any one of the configurations 1 to 12.

Configuration 14

The power conversion device according to the configuration 13, wherein the power conversion device performs a bidirectional operation.

Configuration 15

A power system comprising the power conversion device according to the configuration 13 or 14.

REFERENCE SIGNS LIST 1, 301 Power system
2, 302 DC-DC converter
11, 28 DC power source
12 to 15, 21 to 24 FET
16 Transformer
17, 26, 653 Capacitor
25 Choking coil
27, 272 to 273, 651 to 652 Resistor
31, 31a, 331, 611 Current detecting unit
32 HV voltage detecting unit
33 LV voltage detecting unit
41, 341 Control circuit
51, 53 Grounding end
61, 91 Primary winding
62, 92 Secondary winding
63, 93 Core
81 Current transformer
82, 382 Current-voltage conversion unit
111 External microcomputer
211 First reset resistor
212 Second detection resistor
213 First switching element
214, 232 Diode
231 First detection resistor
251, 251a, 631 Positive voltage level shift circuit
271 Operational amplifier
411 Second reset resistor
412 Second switching element
511, 531 Reference power source
512, 532 Error amplifier
513 Slope voltage source
514 Adder
515 Comparator
516, 533 Reference pulse generator
517, 534 Pulse generator
551 Short-circuit current protection unit
552 NOR circuit
1011 to 1022, 2011 to 2015 Operation waveform

The invention claimed is:

1. A current detection circuit configured to detect a value of a switching current through a detection resistor using a current transformer,
wherein the value of the switching current is detected by switching the detection resistor and a reset resistor on the basis of a flow direction of the switching current flowing on a primary side of the current transformer,
the current detection circuit includes a first diode, a second diode, a first reset resistor, a first detection resistor, a second detection resistor, a first switching element, and a positive voltage level shift circuit,
a series connection circuit of the first diode and the first detection resistor is connected in parallel to a secondary winding of the current transformer,
a series connection circuit of the second diode and the first reset resistor is connected in parallel to the secondary winding of the current transformer,
a series connection circuit of the first switching element and the second detection resistor is connected in parallel to the first reset resistor,
the first diode is connected in a direction in such a way that the first diode is turned on when the switching current flows in a predetermined direction,
the second diode is connected in a direction in such a way that turning-on of the second diode is curbed when the switching current flows in the predetermined direction, and
the positive voltage level shift circuit is configured to convert a negative voltage which is detected through parallel connection of the second detection resistor and the first reset resistor to a positive voltage level.

2. The current detection circuit according to claim 1, wherein the first switching element is turned off when the switching current flows in the predetermined direction, and the first switching element is turned on when the switching current flows in a direction opposite to the predetermined direction.

3. The current detection circuit according to claim 1, wherein, when the current flowing on the primary side of the current transformer flows in both the positive and negative directions, the first detection resistor is used as a detection resistor for the current flowing in the predetermined direction and the second detection resistor is used as a reset resistor by turning on the first switching element when the switching current flows in the predetermined direction as well as when the switching current flows in the direction opposite to the predetermined direction.

4. The current detection circuit according to claim 1, wherein the positive voltage level shift circuit includes an operational amplifier.

5. The current detection circuit according to claim 1, wherein the positive voltage level shift circuit includes a high-pass filter and a DC bias circuit.

6. The current detection circuit according to claim 1, wherein the positive voltage level shift circuit includes an amplifier circuit using a transistor.

7. The current detection circuit according to claim 1, wherein the first switching element is a semiconductor switching element.

8. A power conversion device comprising the current detection circuit according to claim 1.

9. The power conversion device according to claim 8, wherein the power conversion device performs a bidirectional operation.

10. A power system comprising the power conversion device according to claim 8.

11. A current detection circuit configured to detect a value of a switching current through a detection resistor using a current transformer,
wherein the value of the switching current is detected by switching the detection resistor and a reset resistor on the basis of a flow direction of the switching current flowing on a primary side of the current transformer,
wherein the current detection circuit includes a first diode, a second diode, a first reset resistor, a second reset resistor, a first detection resistor, a second detection resistor, a first switching element, a second switching element, and a positive voltage level shift circuit,
a series connection circuit of the first diode and the second reset resistor is connected in parallel to a secondary winding of the current transformer, a series connection circuit of the second switching element and the first detection resistor is connected in parallel to the second reset resistor, a series connection circuit of the second diode and the first reset resistor is connected in parallel to the secondary winding of the current transformer, a series connection circuit of the first switching element and the second detection resistor is connected in parallel to the first reset resistor, the first diode is connected in a direction in such a way that the first diode is turned on when the switching current flows in a predetermined direction, the second diode is connected in a direction in such a way that turning-on of the second diode is curbed when the switching current flows in the predetermined direction, and the positive voltage level shift circuit is configured to convert a voltage which is detected through the second reset resistor to a positive voltage level.

12. The current detection circuit according to claim 11, wherein the first switching element is turned off and the second switching element is turned on when the switching current flows in the predetermined direction, and the first switching element is turned on and the second switching element is turned off when the switching current flows in a direction opposite to the predetermined direction.

13. The current detection circuit according to claim 11, wherein, when the current flowing on the primary side of the current transformer flows in both the positive and negative directions, both the first switching element and the second switching element are turned on, the first detection resistor is used as a detection resistor and the second detection resistor is used as a reset resistor in a forward operation, and the first detection resistor is used as a reset resistor and the second detection resistor is used as a detection resistor in a reverse operation.

14. The current detection circuit according to claim 11, wherein the second switching element is a semiconductor switching element.

15. A power conversion device comprising the current detection circuit according to claim 11.

16. The power conversion device according to claim 15, wherein the power conversion device performs a bidirectional operation.

17. A power system comprising the power conversion device according to claim 15.

* * * * *